United States Patent
Oikawa et al.

(10) Patent No.: US 6,415,251 B1
(45) Date of Patent: Jul. 2, 2002

(54) SUBBAND CODER OR DECODER BAND-LIMITING THE OVERLAP REGION BETWEEN A PROCESSED SUBBAND AND AN ADJACENT NON-PROCESSED ONE

(75) Inventors: Yoshiaki Oikawa; Mitsuyuki Hatanaka; Kenzo Akagiri, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/254,766

(22) PCT Filed: Jul. 10, 1998

(86) PCT No.: PCT/JP98/03117
§ 371 (c)(1),
(2), (4) Date: Jun. 3, 1999

(87) PCT Pub. No.: WO99/03096
PCT Pub. Date: Jan. 21, 1999

(30) Foreign Application Priority Data

Jul. 11, 1997 (JP) .............................. 9-186518
Jan. 30, 1998 (JP) .......................... 10-018923
Jan. 30, 1998 (JP) .......................... 10-018924

(51) Int. Cl.$^7$ .............................................. G10L 19/02
(52) U.S. Cl. ..................... 704/200.1; 704/205; 704/206
(58) Field of Search ............................. 704/200.1, 205, 704/206

(56) References Cited

U.S. PATENT DOCUMENTS

| 5,754,127 A | * | 5/1998 | Tsutsui et al. | ................. 341/54 |
| 6,011,824 A | * | 1/2000 | Oikawa et al. | ............. 375/377 |

FOREIGN PATENT DOCUMENTS

| JP | 7-84595 | 3/1995 | ............. G10L/7/04 |
| JP | 8-125543 | 5/1996 | ............ H03M/7/30 |
| JP | 8-162964 | 6/1996 | ............ H03M/7/30 |
| JP | 8-181619 | 7/1996 | ............ H03M/7/30 |
| JP | 8-305393 | 11/1996 | ............. G10L/7/04 |
| JP | 9-172376 | 6/1997 | ............ H03M/7/30 |
| JP | 9-172377 | 6/1997 | ............ H03M/7/30 |
| JP | 09-214348 | 8/1997 | ............ H03M/7/30 |

OTHER PUBLICATIONS

Joseph H. Rothweiler, "Polyphase Quadrature Filters—A New Subband Coding Technique," ICASSP 1983, Boston.
J.P. Princen, A.W. Johnson and A.B. Bradley, "Subband/Transform Coding Using Filter Bank Designs Based on Time Domain Aliasing Cancellation," Univ of Surrey Royal Melbourne Inst. of Tech., ICASSP 1987.
R. Zelinski and P. Noll, "Adaptive Transform Coding of Speech Signals," IEEE Transactions of Acoustics, Speech, and Signal Processing, vol. ASSP–25, No. 4, Aug. 1997.
M.A. Krasner, "The Critical Band Coder—Digital Encoding of Speech Signals Based on the Perceptual Requirements of the Auditory System,"MIT, ICASSP 1980.

* cited by examiner

Primary Examiner—Tālivaldis Ivars Šmits
(74) Attorney, Agent, or Firm—Sonnenschein, Nath & Rosenthal

(57) ABSTRACT

If all original subbands are not selected for processing in conventional subband coders or decoders aliasing distortion is generated by the characteristics of their subband band-splitting filters or subband band synthesis filters. To improve sound quality in a subband decoder the decoded frequency components in the overlap region adjacent to a subband selected not to be decoded are band-limited prior to synthesis. Alternatively, in a subband coder the sound quality in a processed subband adjacent to one not to be coded is improved by band-limiting the filtering frequency overlap region between these subbands prior to coding. By thus decoding only the non-overlapping part of the subband adjacent to an omitted subband signal distortion is reduced.

72 Claims, 22 Drawing Sheets

SUBBAND CODER OR DECODER BAND-LIMITING THE OVERLAP REGION BETWEEN A PROCESSED SUBBAND AND AN ADJACENT NON-PROCESSED ONE

TECHNICAL FIELD

This invention relates to an information decoding method and device, an information coding method and device, and a providing medium. It particularly relates to an information decoding method and device, an information coding method and device, and a providing medium for restraining output of an unpleasant sound by erasing an aliasing component with respect to a code string formed by coding only a signal of a partial frequency band of acoustic waveform signals.

BACKGROUND ART

Conventionally, there are various methods and devices for high efficiency coding of audio or sound signals. For example, such methods and devices can be exemplified by a transform coding system which is adapted for forming frames of signals in the time domain, then converting (spectral conversion) each frame of signals in the time domain to signals in the frequency domain, splitting the signals into a plurality of frequency bands and coding each band of signals, and a so-called subband coding (SBC) system which is adapted for splitting audio signals in the time domain into a plurality of frequency bands and coding each band of signals, without forming frames of audio signals. Also, there is considered a method and device for high efficiency coding using the above-described subband coding in combination with transform coding. In this case, after band splitting is carried out by the subband coding system, each band of signals are spectrally converted to signals in the frequency domain, and coding is carried out on each spectrally converted band.

As a band splitting filter used in the above-described subband coding system, there is employed, for example, a polyphase quadrature filter (PQF), which is described in Joseph H. Rothweiler, "Polyphase Quadrature Filters—A new subband coding technique," ICASSP 83, BOSTON. This PQF can split a signal into a plurality of bands of equal widths at a time and is characterized in that so-called aliasing is not generated in synthesizing the split bands later.

As the above-described spectral conversion, there is employed spectral conversion for forming frames of input audio signals of predetermined duration and carrying out a discrete Fourier transform (DFT), discrete cosine transform (DCT) or modified discrete cosine transform (MDCT) on each frame so as to convert the time domain to the frequency domain, MDCT is described in J. P. Princen and A. B. Bradley, "Subband/Transform Coding Using Filter Bank Designs Based on Time Domain Aliasing Cancellation," Univ. of Surrey Royal Melbourne Inst. of Tech. ICASSP 1987.

By thus using the filter and spectral conversion to quantize the signals split for each band, the band in which quantization noise is generated can be controlled and coding can be carried out at an auditorily higher efficiency using characteristics such as a so-called masking effect. Also, by normalizing the maximum value of absolute values of signal components for each band before carrying out quantization, coding can be carried out at a higher efficiency.

As a frequency splitting width in quantizing each frequency component (hereinafter referred to as a spectral component) split into frequency bands determined by human auditory characteristics is often employed. Specifically, critical bands whose bandwidths increase as the frequency becomes higher are used to split audio signals into a plurality of bands (for example, 25 bands). In coding each band of data at this point, coding is carried out by using predetermined bit distribution for each band or adaptive bit allocation for each band. For example, in coding coefficient data obtained by MDCT processing by using the foregoing bit allocation, coding is carried out by using an adaptive number of allocated bits with respect to each band of MDCT coefficient data obtained by MDCT processing on each frame.

The following two methods are known as the bit allocation method.

For example, in R. Zelinski and P. Noll, "Adaptive Transform Coding of Speech Signals," IEEE Transactions of Acoustics, Speech, and Signal Processing, Vol.ASSP-25, No.4, August 1977, bit allocation is carried out on the basis of the magnitude of signals of each band. In this method, the quantization noise spectrum becomes flat and the noise energy is minimized. However, since the auditory masking effect is not used, the actual auditory perception of noise is not optimum.

On the other hand, for example, in M. A. Kransner, "The critical band coder—digital encoding of the perceptual requirements of the auditory system," MIT, ICASSP 1980, there is described a method for obtaining a signal-to-noise ratio required for each band by utilizing auditory masking so as to carry out fixed bit allocation. However, in this method, since bit allocation is fixed, a satisfactory characteristic value cannot be obtained even in the case where characteristics are measured by using a sine wave input.

To solve these problems, a high efficiency coding device is proposed in which all the bits that can be used for bit allocation are divided into bits for a fixed allocation pattern predetermined for each band or each block obtained by subdividing each band and bits for bit distribution dependent on the magnitude of signal frequency components in each subband, and in which the division ratio is caused to depend on signals related to input signals to that the division ratio for the fixed bit allocation pattern is increased as the spectral distribution of the signals becomes smoother.

According to this method, in the case where the energy is concentrated on a specified spectral component as in the case of a sine wave input, the overall signal-to-noise characteristic can be significantly improved by allocating a greater number of bits to a block including that spectral component. In general, the human auditory sense is extremely acute with respect to signals having steep spectral distribution. Therefore, improvement of the signal-to-noise characteristic by using such method is effective not only for improving the numerical value of measurement but also for improving the auditorily perceived sound quality.

In addition to the foregoing method, various other methods are proposed as the bit allocation method. If a model related to the auditory sense is made fine to improve the capability of the information coding device, coding can be carried out at an auditorily higher efficiency.

In the case where the above-described DFT or DCT is used as the method for spectral conversion of waveform signals consisting of waveform elements (sample data) such as digital audio signals of the time domain, blocks are formed by every M units of sample data and spectral conversion of DFT or DCT is carried out on each block. By carrying out spectral conversion on such blocks, M units of independent real number data (DFT coefficient data or DCT coefficient data) are obtained. The M units of real number data thus obtained are quantized and coded, thus generating coded data.

In decoding the coded data to reproduce regenerative waveform signals, the coded data are decoded and inversely quantized, and inverse spectral conversion by inverse DFT or inverse DCT is carried out on each block of the resultant real number data corresponding to the block at the time of coding, thus generating waveform element signals. Then, blocks consisting of the waveform element signals are connected to reproduce waveform signals.

In the regenerative waveform signals thus obtained, a connection distortion in connecting the blocks remains, which is less desirable in terms of the auditory sense. Thus, in order to reduce the connection distortion between the blocks, in carrying out spectral conversion using DFT or DCT in actual coding, M1 units of sample data each of the adjacent blocks are caused to overlap each other for spectral conversion.

However, in the case where M1 units of sample data each of the adjacent blocks are caused to overlap each other for spectral conversion, M units of real number data are obtained with respect to (M−M1) units of sample data on the average, and the number of real number data obtained by spectral conversion becomes greater than the number of original sample data actually used for spectral conversion. Since these real number data are subsequently quantized and coded, the increase in the number of real number data obtained by spectral conversion with respect to the original sample data is less desirable in terms of coding efficiency.

On the contrary, in the case where the above-described MDCT is used similarly as the method for spectral conversion of waveform signals consisting of sample data such as digital audio signals, in order to reduce the connection distortion between the blocks, spectral conversion is carried out by using 2M units of sample data obtained by causing M units of sample data each of the adjacent blocks to overlap each other, and M units of independent real number data (MDCT coefficient data) are obtained. Thus, in this spectral conversion using MDCT, M units of real number data are obtained with respect to M units of sample data on the average, and coding can be carried out at a higher efficiency than in the above-described case of spectral conversion using DFT or DCT.

In decoding the coded data obtained by quantizing and coding the real number data obtained by the spectral conversion using MDCT so as to generate regenerative waveform signals, the coded data are decoded and inversely quantized, and inverse spectral conversion by inverse MDCT is carried out on the resultant real number data to obtain waveform elements in the block. Then, the waveform elements in the block are added while being caused to interfere with each other, thus reconstituting waveform signals.

FIG. 1 is a block diagram showing an exemplary structure of a conventional information coding device for coding acoustic waveform signals. Waveform signals inputted from an input terminal are split into, for example, four bands by a band splitting filter 121 employing the above-described polyphase quadrature filter. The signals of the four bands split by the band splitting filter 121 are sent to corresponding spectral conversion circuits 122-1 to 122-4, respectively. The signals of the respective bands inputted to the spectral conversion circuits 122-1 to 122-4 are converted to corresponding signal frequency components, and are then supplied to a quantization precision determination circuit 123 and a normalization/quantization circuit 124. The normalization/quantization circuit 124 carries out normalization and quantization by using quantization precision information found by the quantization precision determination circuit 123.

The normalization/quantization circuit 124 supplies normalized coefficient information consisting of normalized coefficients at the time normalization and coded signal frequency components to a code string generation circuit 125. The code string generation circuit 125 generates a code string from the quantization precision information inputted from the quantization precision determination circuit 123 and the normalized coefficient information and the coded signal frequency components inputted from the normalization/quantization circuit 124, and outputs the generated code string.

FIG. 2 is a block diagram showing a specific exemplary structure of an information decoding device for decoding the code string generated by the information coding device of FIG. 1 so as to generate and output acoustic signals.

A code string resolution circuit 131 extracts, from an inputted code string (code string generated by the information coding device of FIG. 1), information and components corresponding to the normalized coefficient information and the signal frequency components outputted from the normalization/quantization circuit 124 of FIG. 1 and information corresponding to the quantization precision information outputted from the quantization precision determination circuit 123, and outputs the extracted information and components to a signal component decoding circuit 132.

The signal component decoding circuit 132 restores, from the information and components, the respective signal frequency components outputted from the spectral conversion circuits 122-q to 122-4 of FIG. 1, and supplies the signal frequency components to corresponding inverse spectral conversion circuits 133-1 to 133-4, respectively. The inverse spectral conversion circuits 133-1 to 133-4 carry out inverse spectral conversion processing corresponding to the spectral conversion circuits 122-1 to 122-4, respectively, and supply the resultant band signals to a band synthesis filter 134 corresponding to the band splitting filter 121 of FIG. 1. As the band synthesis filter 134, for example, an inverse polyphase quadrature filter (IPQF) is used. The band synthesis filter 134 generates acoustic waveform signals from the signals of four bands supplied from the inverse spectral conversion circuits 133-1 to 133-4, and outputs the acoustic waveform signals.

A method for coding in the information coding device of FIG. 1 will now be described with reference to FIG. 3.

Spectral signal components ES shown in FIG. 3 are obtained by converting input acoustic waveform signals to a total of 64 spectral signal components ES for each predetermined time frame, by the spectral conversion circuits 122-1 to 122-4 of FIG. 1. These 64 spectral signal components ES are gathered in groups (referred to as coding units) by five predetermined bands (bands b1 to b5), and are then normalized and quantized by the normalization/quantization circuit 124. In this case, the bandwidth of the coding units is set to be narrower on the lower frequency side and to be broader on the higher frequency side so that generation of quantization noise can be controlled in accordance with auditory characteristics. In FIG. 3, the levels of absolute values of spectral signals (frequency components) obtained by MDCT processing are converted to dB values, and the normalized coefficient values of the respective coding units are also shown.

In the information coding device of FIG. 1 for coding information in this manner, the scale of the coding device can be reduced by using, for example, only the spectral conversion circuit 122-1 for coding only a desired band without using the other spectral conversion circuits 122-2 to 122-4. Also, if all the information regions used for coding all the bands are used in coding a desired band, the sound quality of the desired band can be improved.

FIG. 4 is a block diagram showing a specific exemplary structure of an information coding device having its hardware scale reduced by carrying out spectral conversion of only the lowest frequency band. In this case, spectral conversion is carried out only on the lowest frequency band. However, as a matter of course, it is possible to carry out spectral conversion only on another arbitrary frequency band.

In FIG. 4, the same circuit components as those of the information coding device of FIG. 1 are denoted by the same numerals and therefore will not be described further in detail. In this information coding device, only the signal frequency component of the lowest frequency band, of the four bands split by the band splitting filter 121, is sent to the spectral conversion circuit 122-1. The other signal frequency components are not used because spectral conversion is not carried out on these signal frequency components. The spectral conversion circuit 122-1 spectrally converts the inputted signal of the predetermined lowest band to a signal frequency component, and supplies the signal frequency component to the quantization precision determination circuit 123 and the normalization/quantization circuit 124. The normalization/quantization circuit 124 carries out normalization and quantization by using quantization precision information found by the quantization precision determination circuit 123.

Although FIG. 4 shows the example in which only the single spectral conversion circuit 122-1 is used, an information coding device using two or three spectral conversion circuits can be similarly realized.

FIG. 5 shows an example of a code string generated by the information coding device of FIGS. 1 or 4. The coding unit information U1 to U5 of this code string is constituted by quantization precision information, normalized coefficient information, and normalized and quantized signal component information SC1 to SC8. The code string is recorded onto a recording medium such as a magneto-optical disc or transmitted through a transmission medium such as a network.

In the coding unit information U1, the quantization precision of the corresponding coding unit is two bits, indicating that eight spectral signal components are included in this coding unit. If the quantization precision information is 0 (zero) as in the coding unit information U4, it is indicated that coding is not actually carried out in this coding unit.

In the information decoding device of FIG. 2 for decoding a code string, the hardware scale required for the information decoding device can be reduced by using, for example, only the inverse spectral conversion circuit 133-1 for outputting only the signal frequency components including a desired band without using the other inverse spectral conversion circuits 133-2 to 133-4.

FIG. 6 is a block diagram showing a specific exemplary structure of an information decoding device having its hardware scale reduced by carrying out inverse spectral conversion of only the lowest frequency band. In this case, inverse spectral conversion is carried out only on the lowest frequency band. However, as a matter of course, it is possible to carry out inverse spectral conversion only on another arbitrary frequency band.

In FIG. 6, the same portions as those of the information decoding device of FIG. 2 are denoted by the same numerals and therefore will not be described further in detail. Of the signal frequency components decoded by the signal component decoding circuit 132, only the signal frequency component of the lowest frequency band is sent to the inverse spectral conversion circuit 133-1. The other signal frequency components are not used because the inverse spectral conversion is not carried out on these signal frequency components. The inverse spectral conversion circuit 133-1 carries out inverse spectral conversion of the signal frequency component of the predetermined lowest band, and supplies the resultant band signal to the band synthesis filter 134. The band synthesis filter 134 generates output acoustic signals from the band signal from the inverse spectral conversion circuit 133-1 and band signals having a value 0 inputted from terminals 101 to 103, and outputs the output acoustic signals.

In the information decoding device of such structure, by selecting the reproducing band, it suffices to use only the single inverse spectral conversion circuit 133-1 as shown in FIG. 6, while the four inverse spectral conversion circuits 133-1 to 133-4 are required in the decoding device of FIG. 2. Thus, the hardware scale of the decoding device can be diminished and the cost can also be reduced.

Although FIG. 6 shows the example in which only the single inverse spectral conversion circuit is used, an information decoding device using two or three inverse spectral conversion circuits can be similarly realized.

Meanwhile, in the case where the code string generated by the information coding device of FIG. 4 is decoded by using the information decoding device of FIG. 2, or in the case where the code string generated by the information coding device of FIG. 1 is decoded by using the information decoding device of FIG. 6, the aliasing component generated by the characteristics of the band splitting filter 121 or the band synthesis filter 134 is not cancelled but is included in the output acoustic signals, thus raising a problem of deterioration in sound quality.

This problem will now be described using specific examples. FIG. 7 shows frequency characteristics in the case where the above-described polyphase quadrature filter of quadrisection is used as the band splitting filter 121. The lateral axis represents the frequency, and 6 kHz, 12 kHz and 18 kHz scaled on the lateral axis represent the split frequencies in the case where the sampling frequency is 48 kHz. Overlapping of the characteristics of the filter is generated in a frequency region of a predetermined width around the split frequency as the center, and the signals of that region are included in the output of the filter, as the aliasing components, which are frequency signals symmetrical with respect to the split frequency, with the magnitude of amplitude corresponding to the cut-off characteristics of the filter. In the vicinity of the split frequency of 6 kHz, a region from 5 kHz to 7 kHz is a region where the filter characteristics overlap.

FIG. 8 shows the state of an aliasing component generated in the case where signal components exist in the vicinity of the split frequency of 6 kHz. An aliasing component B, corresponding to an original signal A which is a frequency signal component exceeding 6 kHz in the above-described region where the filter characteristics overlap, appears in the frequency band not higher than 6 kHz.

In general, this aliasing component B is cancelled by the original signal A in decoding. Similarly, an aliasing component appears in the frequency band exceeding 6 kHz, but this aliasing component is cancelled by the original signal in decoding.

However, in the case where the code string generated by the information coding device of FIG. 4 is decoded by the information decoding device of FIG. 2, the frequency component not lower than 6 kHz does not exist, and therefore the aliasing component not higher than 6 kHz cannot be cancelled in the band synthesis filter 134. Also, the signal for cancelling the aliasing component by the original signal not higher than 6 kHz appears as a signal component not lower than 6 kHz.

In the information decoding device of FIG. 6, since inverse spectral conversion processing using the inverse spectral conversion circuit is not carried out with respect to the frequency not lower than 6 kHz, the original signal not lower than 6 kHz does not exist and the aliasing component not higher than 6 kHz is not cancelled in the band synthesis filter 134. Also, the signal for cancelling the aliasing component by the original signal not higher than 6 kHz appears as a signal component not lower than 6 kHz.

The signal thus generated appears in the output acoustic signals, depending on the frequency signal component of the original signal. Therefore, the demodulated acoustics signals are heard as unpleasant sounds.

DISCLOSURE OF THE INVENTION

In view of the foregoing status of the art, it is an object of the present invention to enable restraint of deterioration in sound quality at the time of coding and decoding only a part of frequency bands of waveform signals split into a plurality of frequency bands.

An information decoding method according to the present invention is adapted for decoding a signal comprising at least one frequency band from a code string obtained by converting and coding a signal split into a plurality of adjacent frequency bands, including a first frequency band adjacent to a second frequency band. The method includes: selecting the first frequency band as a frequency band to be decoded and selecting the second frequency band as a frequency band not to be decoded; in the first frequency band, band-limiting a signal component in a filtering frequency overlap region between the first frequency band and the second frequency band; and inversely converting the band-limited signal component in the first frequency band.

An information decoding device according to the present invention is adapted for decoding a signal comprising at least one frequency band from a code string obtained by converting and coding a signal split into a plurality of adjacent frequency bands, including a first frequency band adjacent to a second frequency band. The device includes: means for selecting the first frequency band as a frequency band to be decoded and selecting the second frequency band as a frequency band not to be decoded; means for band-limiting, in the first frequency band, a signal component in a frequency filtering overlap region between the first frequency band and the second frequency band; and means for inversely converting the band-limited signal component in the first frequency band.

In the information decoding method and the information decoding device, when decoding a signal of at least one frequency band from a code string obtained by converting and coding a signal split into a plurality of frequency bands, the value of a signal component of a band adjacent to a band not be decoded, of the bands to be decoded, is limited.

A providing medium according to the present invention is adapted for providing processing for decoding a signal comprising at least one frequency band from a code string obtained by converting and coding a signal split into a plurality of adjacent frequency bands, including a first frequency band adjacent to a second frequency band. The processing includes: selecting the first frequency band as a frequency band to be decoded and selecting the second frequency band as a frequency band not to be decoded; in the first frequency band, band-limiting a signal component in a filtering frequency overlap region between the first frequency band and the second frequency band; and inversely converting the band-limited signal component in the first frequency band.

An information decoding method according to the present invention is adapted for decoding a signal comprising at least one frequency band from a code string obtained by converting and coding a signal split into a plurality of adjacent frequency bands, including a first frequency band adjacent to a second frequency band. The method includes: identifying that the first frequency band is encoded and the second frequency band is not encoded; in the first frequency band, band-limiting a signal component in a filtering frequency overlap region between the first frequency band and the second frequency band; and inversely converting the band-limited signal component in the first frequency band.

An information decoding device according to the present invention is adapted for decoding a signal comprising at least one frequency band from a code string obtained by converting and coding a signal split into a plurality of adjacent frequency bands, including a first frequency band adjacent to a second frequency band. The device includes: means for identifying that the first frequency band is encoded and the second frequency band is not encoded; means for band-limiting, in the first frequency band, a signal component in a filtering frequency overlap region between the first frequency band and the second frequency band; and means for inversely converting the band-limited signal component in the first frequency band.

A providing medium according to the present invention is adapted for providing processing for decoding a signal comprising at least one frequency band from a code string obtained by converting and coding a signal split into a plurality of adjacent frequency bands, including a first frequency band adjacent to a second frequency band. The processing includes: identifying that the first frequency band is encoded and the second frequency band is not encoded; in the first frequency band, band-limiting a signal component in a filtering frequency overlap region between the first frequency band and the second frequency band; and inversely converting the band-limited signal component in the first frequency band.

An information decoding method according to the present invention is adapted for decoding a code string obtained by converting and coding at least one band of a signal split into a plurality of frequency bands, including a first frequency band adjacent to a second frequency band. The method includes: selecting the first frequency band as a frequency band to be decoded and selecting the second frequency band as a frequency band not to be decoded; band-limiting a signal component of the first frequency band in a filtering frequency overlap region between the first frequency band and the second frequency band; and inversely converting the band-limited signal component of the first frequency band.

An information decoding device according to the present invention is adapted for decoding a code string obtained by converting and coding at least one band of a signal split into a plurality of frequency bands, including a first frequency band adjacent to a second frequency band. The device includes: means for selecting the first frequency band as a frequency band to be decoded and selecting the second frequency band as a frequency band not to be decoded; means for band-limiting a signal component of the first frequency band in a filtering frequency overlap region between the first frequency band and the second frequency band; and means for inversely converting the band-limited signal component of the first frequency band.

A providing medium according to the present invention is adapted for providing processing for decoding a code string obtained by converting and coding at least one band of a signal split into a plurality of frequency bands, including a first frequency band adjacent to a second frequency band. The processing includes: selecting the first frequency band as a frequency band to be decoded and selecting the second frequency band as a frequency band not to be decoded; band-limiting a signal component of the first frequency band in a filtering frequency overlap region between the first frequency band and the second frequency band; and inversely converting the band-limited signal of the first frequency band.

An information decoding method according to the present invention is adapted for decoding a code string obtained by coding at least one frequency band of a signal split into a plurality of frequency bands, including a first frequency band adjacent to a second frequency band. The method includes: in the first frequency band, restoring frequency signal components from the code string; and inversely converting the restored frequency signal components; where the inverse frequency conversion step includes limiting the value of a signal component existing in a frequency overlap region between the first frequency band and the second frequency band.

An information decoding device according to the present invention is adapted for decoding a code string obtained by coding at least one frequency band of a signal split into a plurality of adjacent frequency bands, including a first frequency band adjacent to a second frequency band. The device includes: means for selecting the first frequency band as a frequency band to be decoded and selecting the second frequency band as a frequency band not to be decoded; means for restoring, in the first frequency band, frequency signal components from the code string; and means for inversely converting the restored frequency signal components; where the inverse frequency conversion means includes means for limiting the value of a signal component existing in a frequency overlap region between the first frequency band and the second frequency band.

A providing medium according to the present invention is adapted for providing processing for decoding a code string obtained by coding at least one frequency band of a signal split into a plurality of adjacent frequency bands, including a first frequency band adjacent to a second frequency band. The processing includes: selecting the first frequency band as a frequency band to be decoded and selecting the second frequency band as a frequency band not to be decoded; in the first frequency band, restoring frequency signal components from the code string; and inversely converting the restored frequency signal components; where the inverse frequency conversion step includes limiting the value of a signal component existing in a frequency overlap region between the first frequency band and the second frequency band.

An information coding method according to the present invention is adapted for coding an input signal. The method includes: splitting the input signal into a plurality of frequency bands, including a first frequency band adjacent to a second frequency band; selecting the first frequency band to be coded; selecting the second frequency band not to be coded; converting the first frequency band to a signal frequency component; band-limiting the signal component of the first frequency band in a filtering frequency overlap region between the first frequency band and the second frequency band.

An information coding device according to the present invention is adapted for coding an input signal. The device includes: means for splitting the input signal into a plurality of frequency bands, including a first frequency band adjacent to a second frequency band; means for selecting the first frequency band to be coded; means for selecting the second frequency band not to be coded; means for converting the first frequency band to a signal frequency component; means for band-limiting the signal component of the first frequency band in a filtering frequency overlap region between the first frequency band and the second frequency band.

A providing medium according to the present invention is adapted for providing processing for coding an input signal. The processing includes: splitting the input signal into a plurality of frequency bands, including a first frequency band adjacent to a second frequency band; selecting the first frequency band to be coded; selecting the second frequency band not to be coded; converting the first frequency band to a signal frequency component; band-limiting the signal component of the first frequency band in a filtering frequency overlap region between the first frequency band and the second frequency band.

An information coding method according to the present invention is adapted for coding an input signal. The method includes: splitting the input signal into a plurality of frequency bands, including a first frequency band adjacent to a second frequency band; selecting the first frequency band to be coded; selecting the second frequency band not to be coded; converting a time signal of the first frequency to frequency signal components and coding the frequency signal components; and generating a code string from the coded signal; where converting the time signal includes band-limiting a signal component of the first frequency band in a filtering frequency overlap region between the first frequency band and the second frequency band.

An information coding device according to the present invention is adapted for coding an input signal. The device includes: means for splitting the input signal into a plurality of frequency bands, including a first frequency band adjacent to a second frequency band; selecting the first frequency band to be coded; selecting the second frequency band not to be coded; means for converting a time signal of the first frequency to frequency signal components and coding the frequency signal components; and means for generating a code string from the coded signal; where the converting means includes means for band-limiting a signal component of the first frequency band in a filtering frequency overlap region between the first frequency band and the second frequency band.

A providing medium according to the present invention is adapted for providing processing for coding an input signal. The processing includes: splitting the input signal into a plurality of frequency bands, including a first frequency band adjacent to a second frequency band; selecting the first frequency band to be coded; selecting the second frequency band not to be coded; converting a time signal of the first frequency to frequency signal components and coding the frequency signal components; and generating a code string from the coded signal; where converting the time signal includes band-limiting a signal component of the first frequency band in a filtering frequency overlap region between the first frequency band and the second frequency band.

A providing medium according to the present invention is adapted for providing a signal coded by an information coding method for coding an input signal. The information coding method includes: splitting the input signal into a plurality of frequency bands, including a first frequency band adjacent to a second frequency band; selecting the first frequency band to be coded; selecting the second frequency band not to be coded; band-limiting a signal component of the first frequency band in a filtering frequency overlap region between the first frequency band and the second frequency band; and converting the band-limited signal.

A providing medium according to the present invention is adapted for providing a signal coded by an information coding method for coding an input signal. The information coding method includes: splitting the input signal into a plurality of frequency bands, including a first frequency band adjacent to a second frequency band; selecting the first frequency band to be coded; selecting the second frequency band not to be coded; converting a time signal of the first frequency to frequency signal components and coding the frequency signal components; and generating a code string from the coded signal; wherein converting the time signal includes band-limiting a signal component of the first frequency band in a filtering frequency overlap region between the first frequency band and the second frequency band.

BEST MODE FOR CARRYING OUT THE INVENTION

Preferred embodiments of the present invention will now be described with reference to the drawings.

Figure 6:
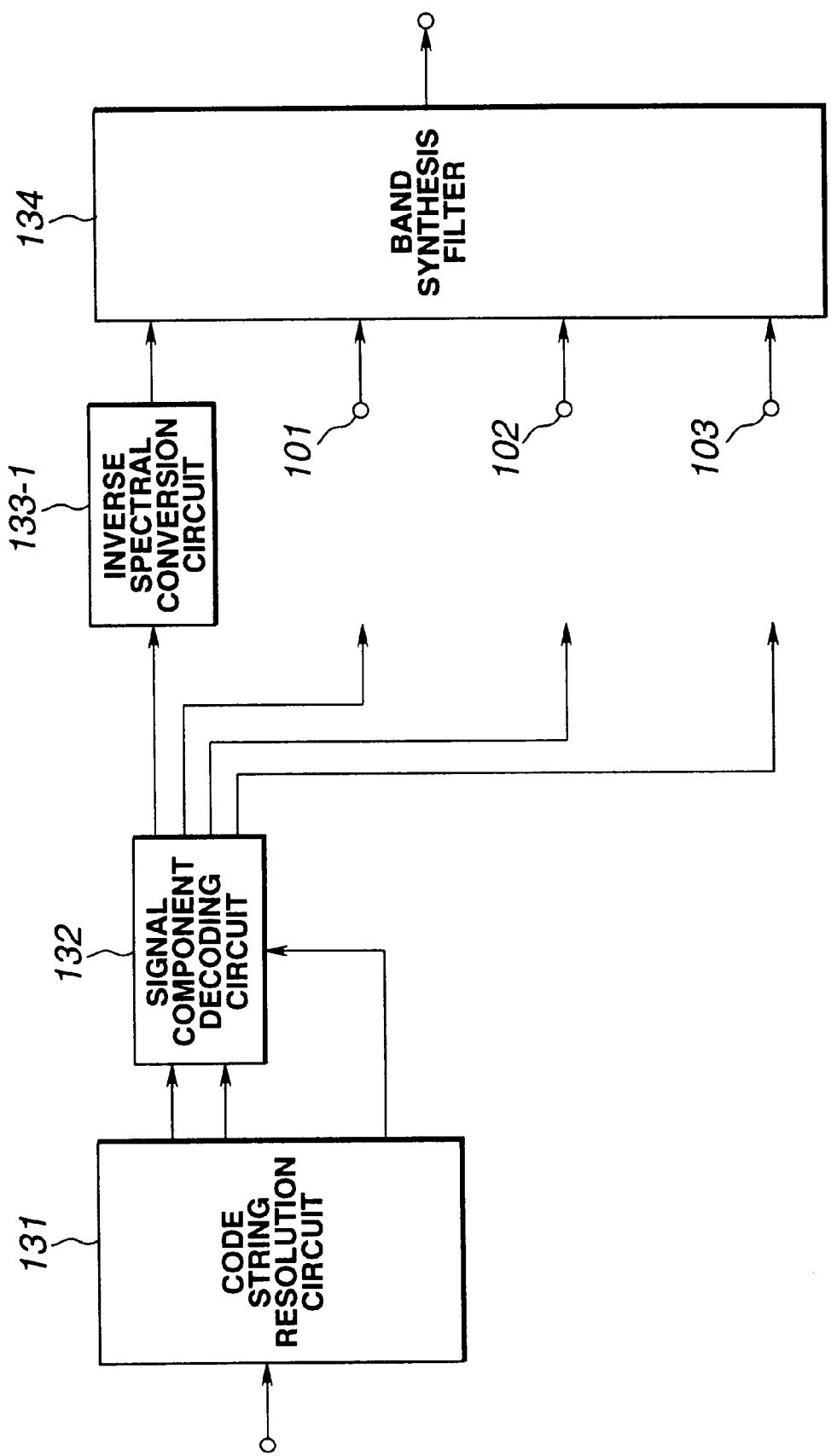
FIG. 6 is a block diagram showing another exemplary structure of the conventional information decoding device.
Figure 9:
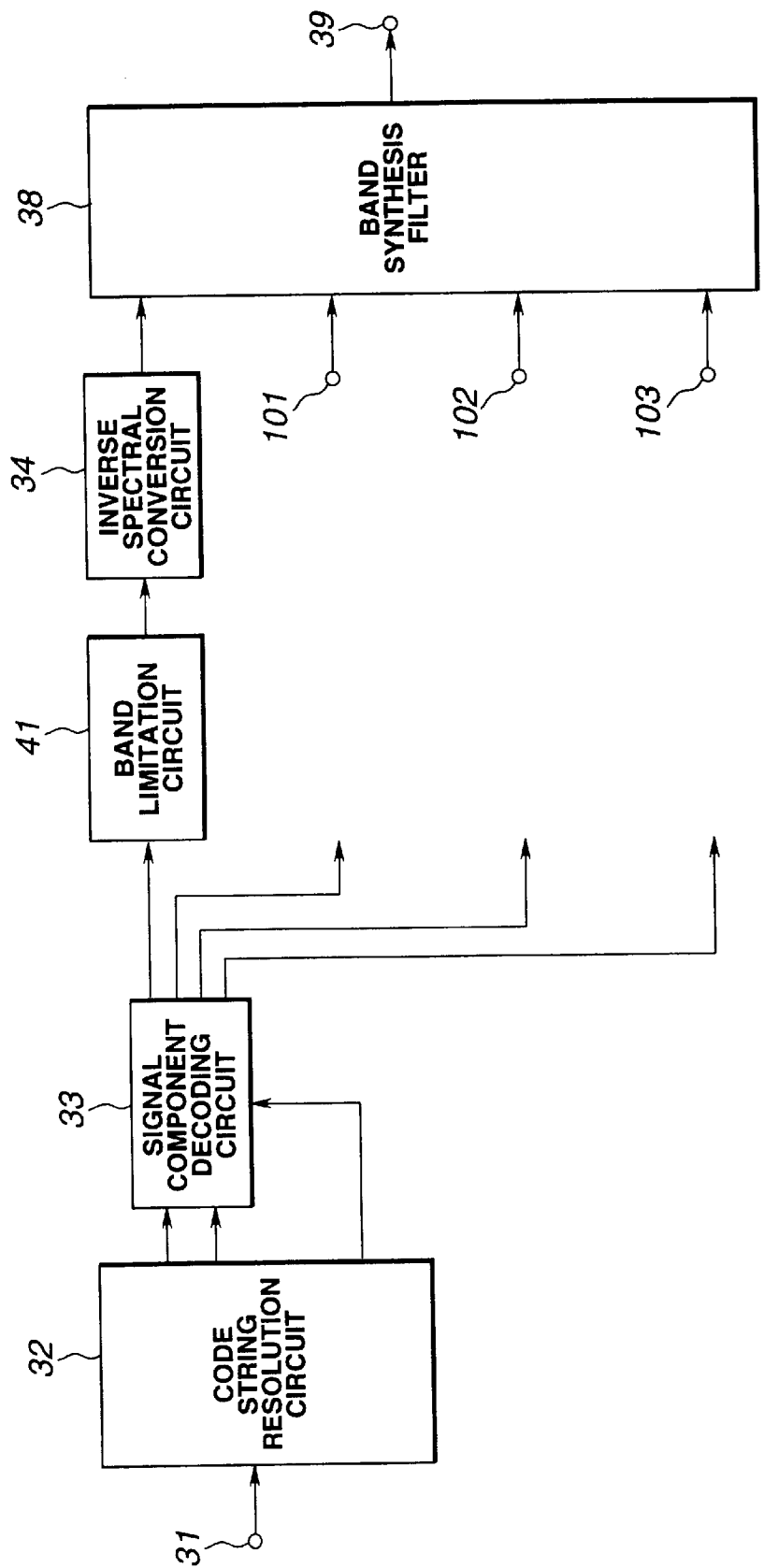
FIG. 9 is a block diagram showing an exemplary structure of an embodiment of an information decoding device according to the present invention.

FIG. 9 is a block diagram showing an exemplary structure of an embodiment of an information decoding device according to the present invention. The information decoding device shown in FIG. 9 has such a structure that a band limitation circuit 41 for limiting the band is newly provided between a signal component decoding circuit 33 and an inverse spectral conversion circuit 34 in the conventional information decoding device shown in FIG. 6. The other parts of the structure are similar to those of the information decoding device of FIG. 6 and therefore will not be described further in detail.

Figure 1:
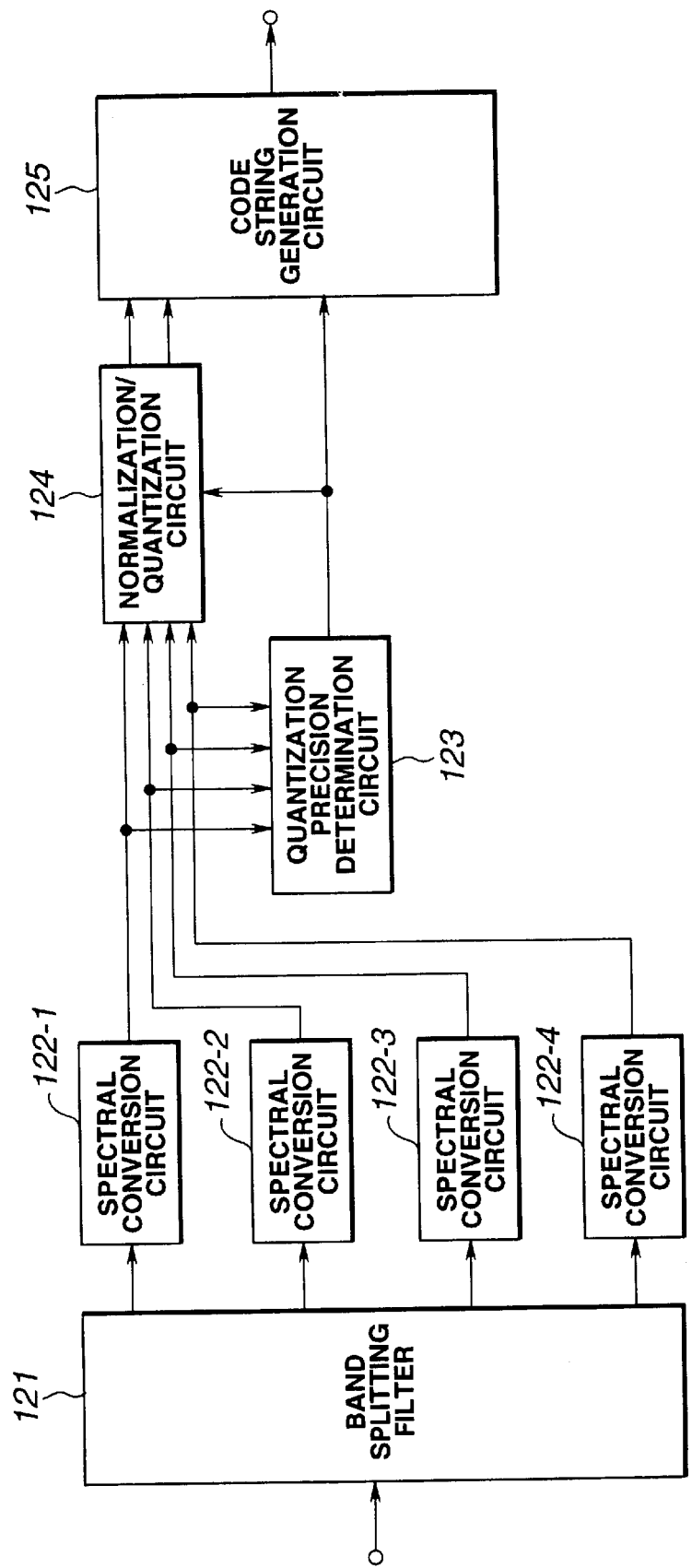
FIG. 1 is a block diagram showing an exemplary structure of a conventional information coding device.

The operation of the device will be described next. When a code string corresponding to the code string outputted from the coding device of FIG. 1 is supplied to an input terminal 31, this code string is sent to a code string resolution circuit 32. The code string resolution circuit 32 extracts, from the code string, information and components corresponding to the normalized coefficient information and the signal frequency components supplied from the normalization/quantization circuit 124 of FIG. 1 and information corresponding to the quantization precision information supplied from the quantization precision determination circuit 123 of FIG. 1, and sends the extracted information and components to the signal component decoding circuit 33.

The signal component decoding circuit 33 restores original signal frequency components (signals outputted from the spectral conversion circuits 122-1 to 122-4 of FIG. 1) from these information (normalized coefficient information and quantization precision information) and signal frequency components, and then sends only the signal frequency component of the lowest frequency (signal frequency component corresponding to the signal outputted from the spectral conversion circuit 122-1 of FIG. 1) to the band limitation circuit 41. The other signal frequency components are not used here because inverse spectral conversion is not carried out on these signal frequency components.

In this example, the signal frequency components are not used after being decoded. However, it is also possible that these signal frequency components are not decoded by the signal component decoding circuit 33, thus omitting unnecessary decoding processing.

The band limitation circuit 41 sets, at 0, the value of the signal frequency component of a region where characteristics of the band splitting filter 12 overlap, from among the signal frequency components supplied from the signal component decoding circuit 33, and generates a band-limited signal frequency component. The band limitation circuit 41 supplies the band-limited signal frequency component to the inverse spectral conversion circuit 34.

The inverse spectral conversion circuit 34 carries out inverse spectral conversion of the signal frequency component supplied from the band limitation circuit 41, and supplies the resultant band signal to a band synthesis filter 38.

The band synthesis filter 38 generates acoustic waveform signals from the band signal inputted from the inverse spectral conversion circuit 34 and the band signals of the value 0 inputted from terminals 101 to 103, and outputs the acoustic waveform signals from an output terminal 39.

Figure 10A:
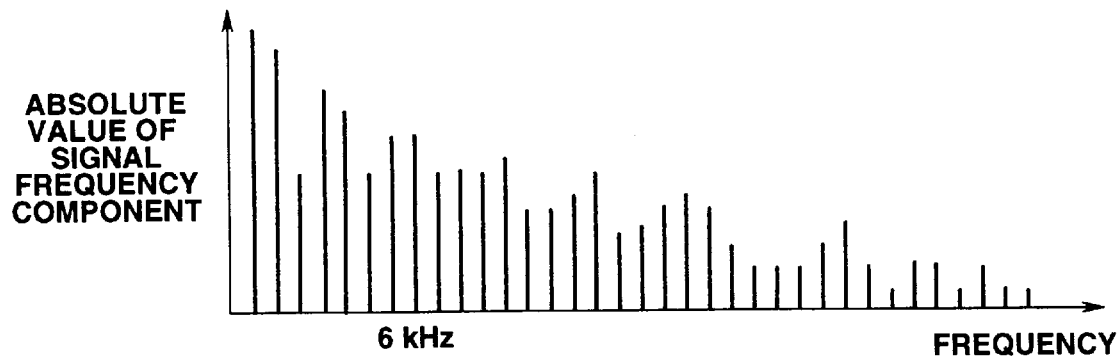
FIGS. 10A to 10C illustrate a processing method in the information decoding device of FIG. 9.
Figure 10B:
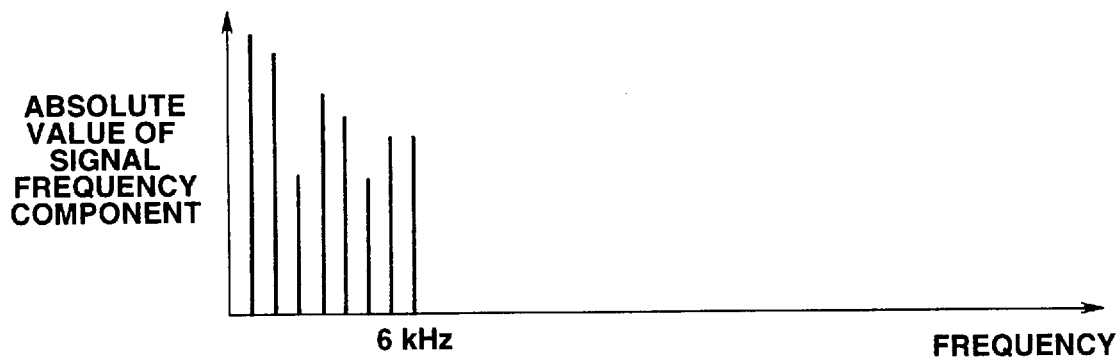
Figure 10C:
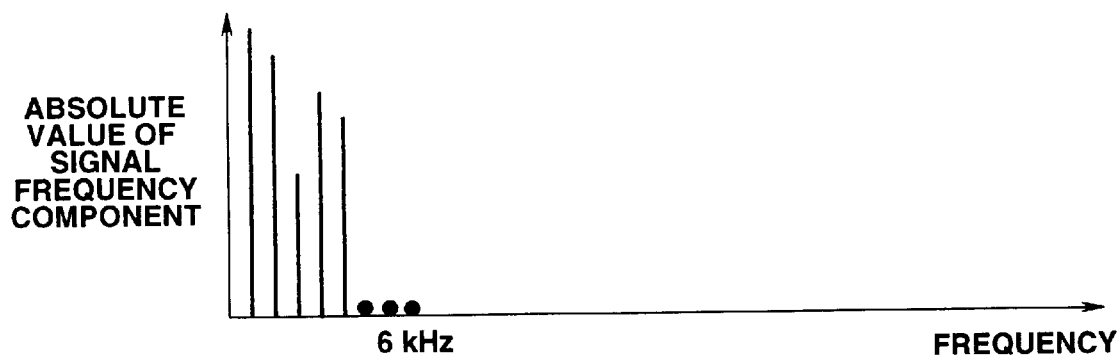

FIGS. 10A to 10C show examples of signal frequency components in the embodiment shown in FIG. 9. The lateral axis represents the frequency and the longitudinal axis represents the absolute value of the signal frequency component. FIG. 10A shows an example of signal frequency components of all bands, that is, all the signal frequency components as the output of the signal component decoding circuit 33 of FIG. 9. FIG. 10B shows only the signal frequency components of the lowest band, of the signal frequency components of all bands of FIG. 10A. These signal frequency components are inputted to the band limitation circuit 41. FIG. 10C shows an output signal of the band limitation circuit 41 at the time when the signal frequency components of FIG. 10B are inputted to the band limitation circuit 41. It can be understood from FIG. 10C that the value of three signal frequency components corresponding the signal frequency components in the region where the characteristics of the band splitting filter 121 of FIG. 1 overlap (in this case, a region from 5 kHz to 7 kHz) is 0.

Figure 11:
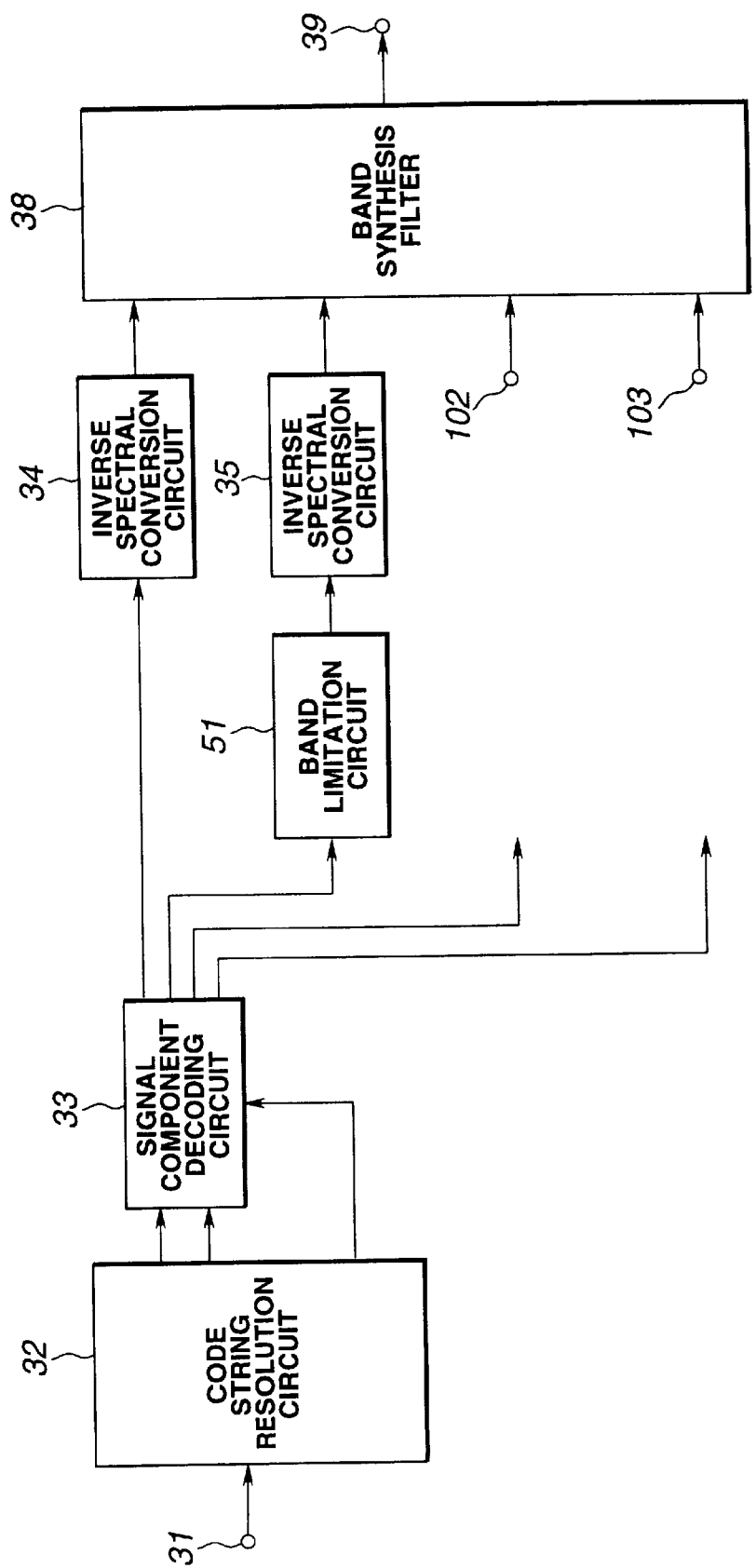
FIG. 11 is a block diagram showing an exemplary structure of another embodiment of the information decoding device according to the present invention.

FIG. 11 is a block diagram showing an exemplary structure of another embodiment of the information decoding device according to the present invention. The information decoding device shown in FIG. 11 has such a structure that an inverse spectral conversion circuit 35 is provided in the information decoding device of FIG. 9 so that inverse spectral conversion is carried out on two bands from the lowest frequency band. Also, in place of the band limitation circuit 41 of FIG. 9, a band limitation circuit 51 is provided between a signal component decoding circuit 33 and the inverse spectral conversion circuit 35.

The other parts of the structure and the operation thereof are similar to those of FIG. 9 and therefore will not be described further in detail. In the information decoding device of FIG. 11, a signal frequency component of the second band from the lowest frequency band is inputted to the band limitation circuit 51, and the band-limited signal frequency component is supplied to the inverse spectral conversion circuit 35. The inverse spectral conversion circuit 35 supplies the band signal on which inverse spectral conversion has been carried out, to a band synthesis filter 38. The signal frequency component of the lowest frequency band is supplied to an inverse spectral conversion circuit 34, where inverse spectral conversion processing is carried out. After that, the band signal is supplied to the band synthesis filter 38.

In the embodiment shown in FIG. 11, output acoustic signals of bands twice that of the embodiment of FIG. 9 can be obtained, and two inverse spectral conversion circuits can be omitted.

Figure 12:
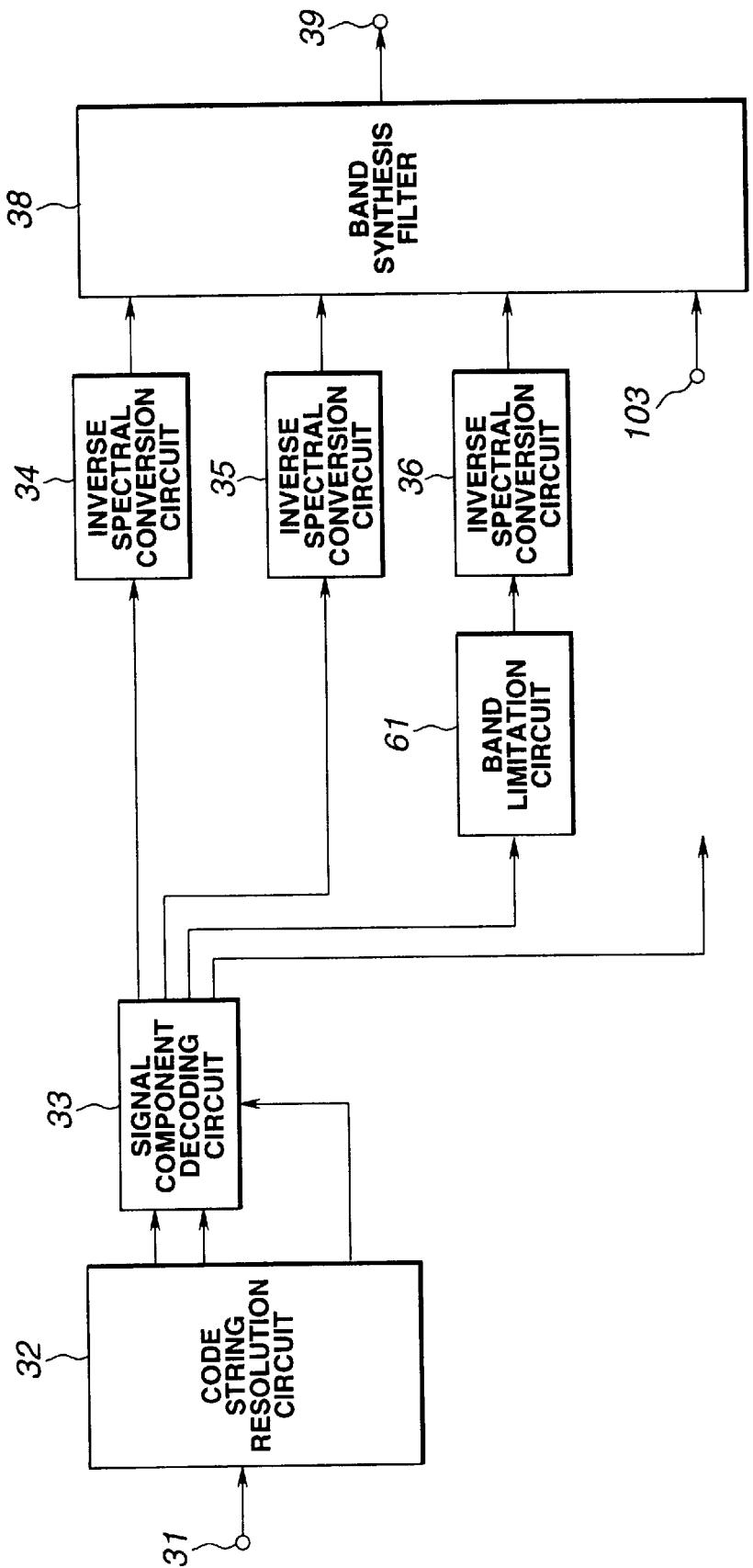
FIG. 12 is a block diagram showing an exemplary structure of still another embodiment of the information decoding device according to the present invention.

FIG. 12 is a block diagram showing an exemplary structure of still another embodiment of the information decoding device according to the present invention. The information decoding device shown in FIG. 12 has such a structure that inverse spectral conversion is carried out on three bands from the lowest frequency band. That is, the information decoding device of FIG. 12 has such a structure that an inverse spectral conversion circuit 36 is provided in the information decoding device of FIG. 11 so that inverse spectral conversion is carried out on three bands from the lowest frequency band. Also, in place of the band limitation circuit 51 of FIG. 11, a band limitation circuit 61 is provided between a signal component decoding circuit 33 and the inverse spectral conversion circuit 36.

The other parts of the structure and the operation thereof are similar to those of FIG. 11 and therefore will not be described further in detail. A signal frequency component of the third band from the lowest frequency band is inputted to the band limitation circuit 61, and an output of the band limitation circuit 61 is supplied to the inverse spectral conversion circuit 36, where inverse spectral conversion processing is carried out. After that, the resultant band signal is supplied to a band synthesis filter 38. In the embodiment shown in FIG. 12, output acoustic signals of bands three times that of the embodiment of FIG. 9 can be obtained, and one inverse spectral conversion circuit can be omitted.

Figure 13:
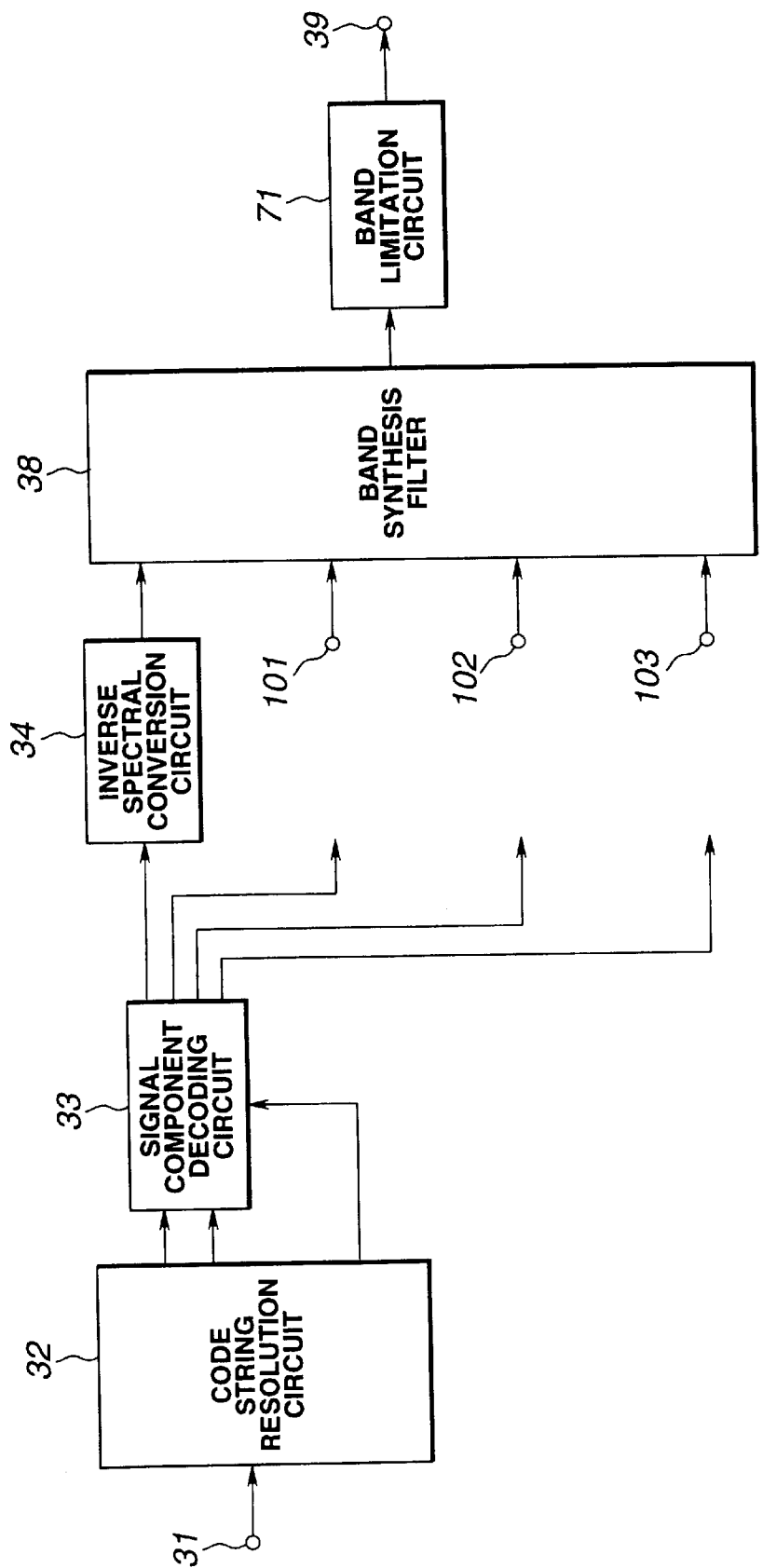
FIG. 13 is a block diagram showing an exemplary structure of still another embodiment of the information decoding device according to the present invention.

FIG. 13 is a block diagram showing an exemplary structure of still another embodiment of the information decoding device according to the present invention. The information decoding device shown in FIG. 13 has such a structure that a band limitation circuit 71 is newly provided after a band synthesis filter 38 in the conventional information decoding device of FIG. 6. The other parts of the structure and the operation thereof are similar to those of FIG. 6 and therefore will not be described further in detail.

In the information decoding device shown in FIG. 13, acoustic signals as an output of the band synthesis filter 38 are inputted to the band limitation circuit 71. The band limitation circuit 71 limits the band of the output signals so as not to include the region where the band splitting filter characteristics overlap, of the band which is to be processed by inverse spectral conversion adjacent to the band which is not to be processed by inverse spectral conversion. That is, band limitation on the time base is carried out. Thus, sounds of unnecessary signal components can be prevented from being outputted.

Figure 14:
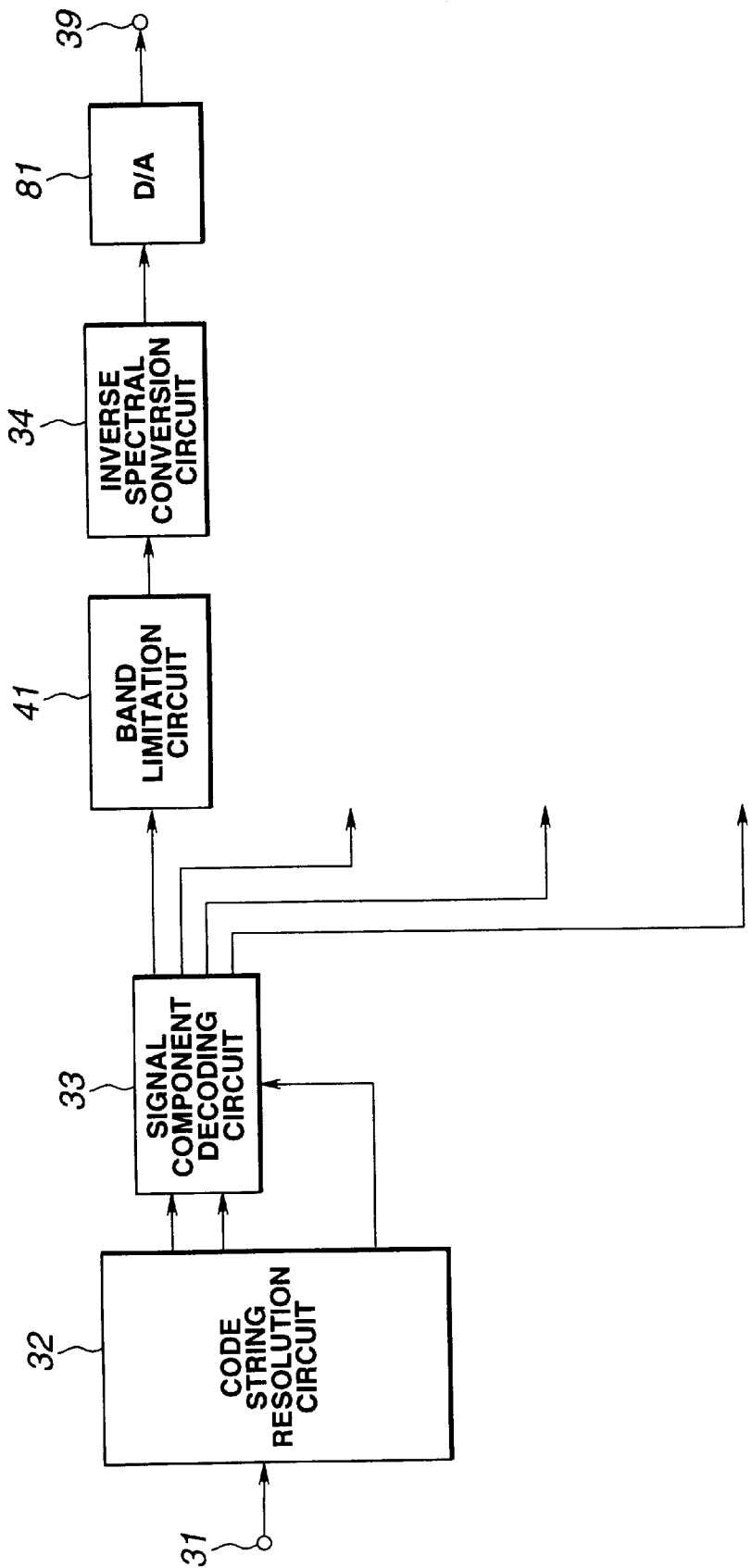
FIG. 14 is a block diagram showing an exemplary structure of still another embodiment of the information decoding device according to the present invention.

FIG. 14 is a block diagram showing an exemplary structure of still another embodiment of the information decoding device according to the present invention. The information decoding device shown in FIG. 14 has such a structure that the band synthesis filter 38 is removed from the information decoding device of FIG. 9 while a D/A converter 81 is provided therein. The other parts of the structure and the operation thereof are similar to those described with reference to FIG. 9.

The D/A converter 81 converts a digital signal from an inverse spectral conversion circuit 34 to an analog signal, and outputs the analog signal from an output terminal 39. In this example, since the frequency of the signal from the inverse spectral conversion circuit 34 is reduced ¼, the D/A converter 81 increases the frequency to four times and then outputs the signal. With such a structure, effects similar to those of the foregoing embodiment can be obtained.

As described above, in the above-described embodiments, before inverse spectral conversion is carried out on the signal frequency component of the highest frequency band of the bands which are to be processed by inverse spectral conversion, the aliasing component generated when the inverse spectral conversion circuit is omitted is erased by using the first method (method in the embodiments of FIGS. 9, 11 and 12) for limiting the band by setting, at 0, the value of the signal frequency component of the region where the band splitting filter characteristics overlap, or the second method (method in the embodiment of FIG. 13) for providing the band limitation filter at the output of the band synthesis filter. Thus, generation of unpleasant sounds is restrained.

The first method for limiting the band before inverse spectral conversion and the second method for limiting the band after band synthesis by the band synthesis filter are now compared with each other. In the first method, since it suffices to set, at 0, the value of the signal frequency component of the region where the characteristics of the band splitting filter 121 overlap, the processing quantity is negligibly small and steep band limitation characteristics can be obtained. On the other hand, in the second method, since band limitation is carried out on the time base, a filter of a high order must be used to obtain steep band limitation characteristics and a further temporal delay due to filter processing is generated.

Thus, though it is desired to use the first method for the purpose of reducing the scale of the information decoding device, similar effects can also be obtained by the second method.

In the above-described embodiments, the number of split bands generated by the band splitting filter is four. However, the number of split bands is not limited to four and a greater or smaller number may also be used.

In the above-described embodiments, one or plural bands including the lowest frequency band are decoded. However, it is also possible to decode only an intermediate band. In such case, band limitation must be carried out on the upper and lower ends of that band.

The information decoding device of the present invention can be applied to, for example, DVD (digital versatile disc) or satellite broadcast using the MPEG (Moving Picture Experts Group) 2 or AAC (Advanced Audio Coding) system.

With the information decoding method and the information decoding device as described above, in extracting a plurality of bands of signals from the code string and decoding only signals of a predetermined band of the plural bands, the band adjacent to the band not to be decoded, of the bands to be decoded, is limited. Therefore, the aliasing component can be erased to restrain generation of unpleasant sounds, thus outputting satisfactory sounds.

Figure 4:
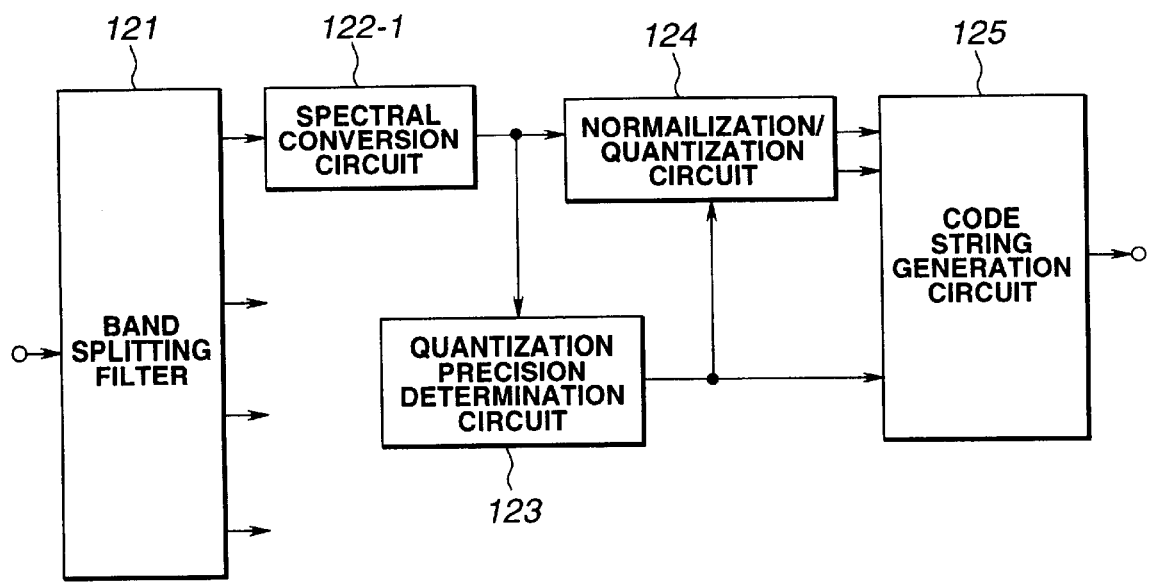
FIG. 4 is a block diagram showing another exemplary structure of the conventional information coding device.
Figure 5:
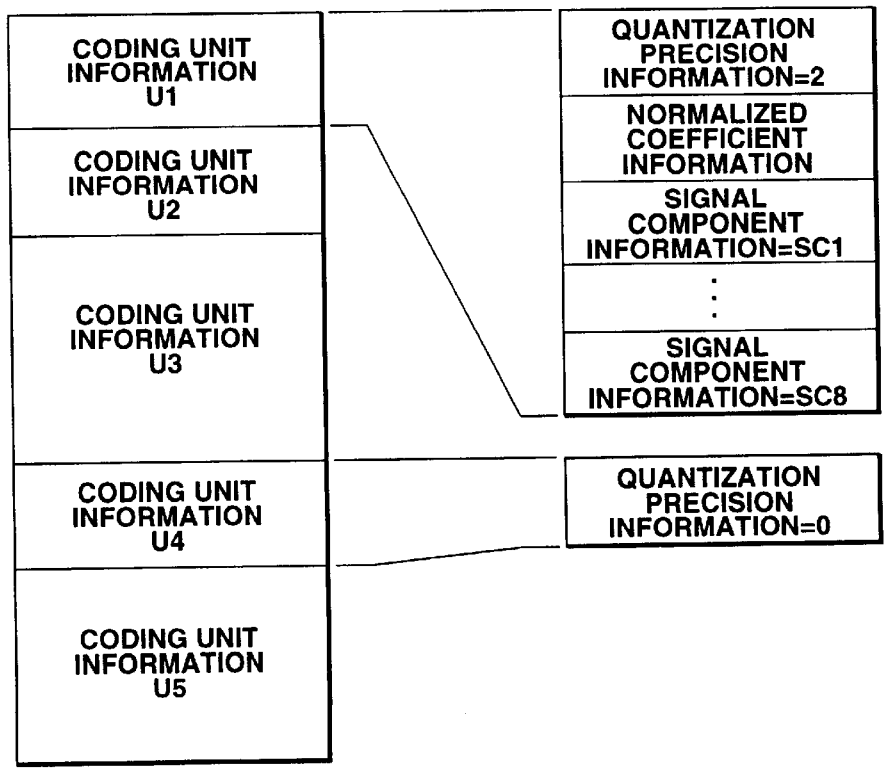
FIG. 5 shows a code string coded by the conventional information coding device.
Figure 15:
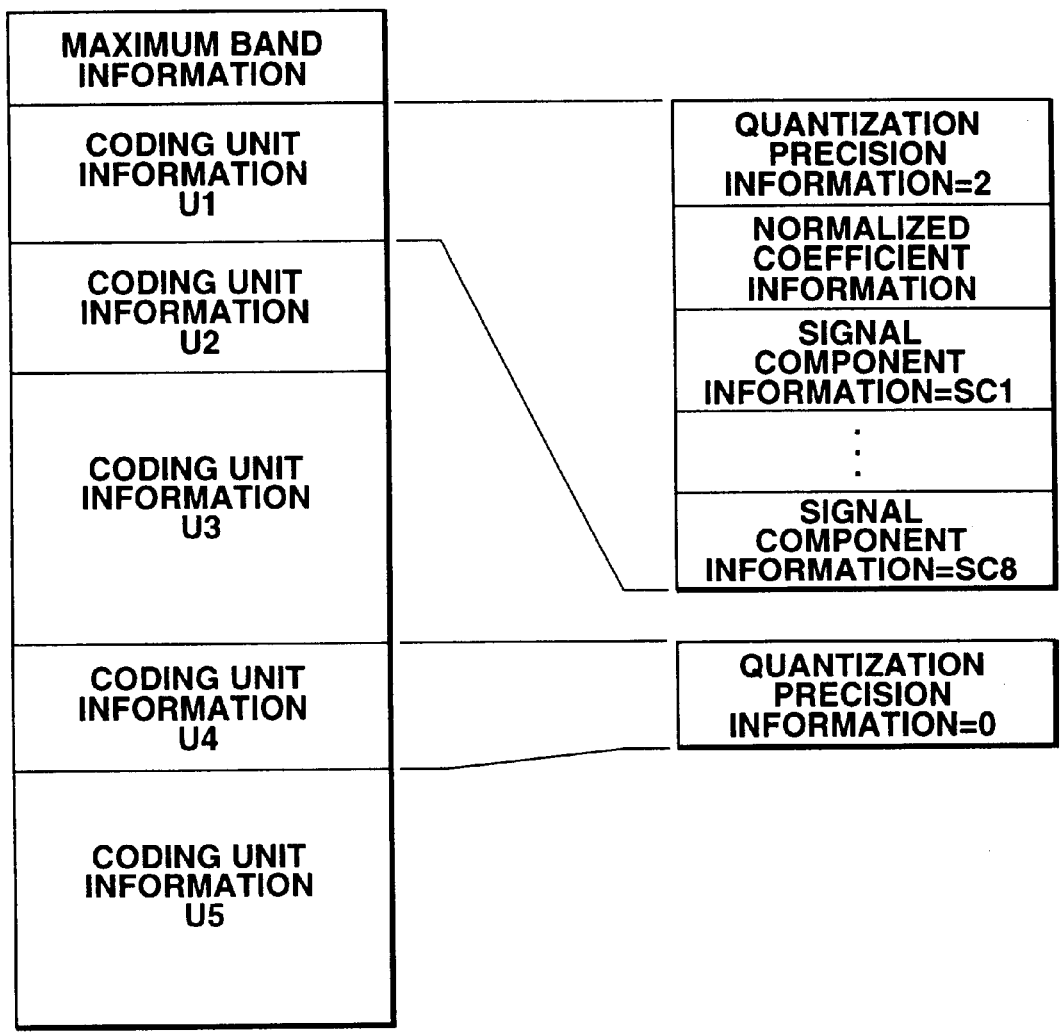
FIG. 15 illustrates a code string which is decoded by the information decoding device according to the present invention.

Before explaining another exemplary structure of the information decoding device of the present invention, a code string to be decoded by the information decoding device will be described with reference to FIG. 15. This code string is obtained by coding signals of a part of the frequency bands of input signals and setting the value of signals of the other frequency regions at 0, similarly to the code string generated by the information coding device of FIGS. 1 or 4. This code string is constituted by a header and coding unit information U1 to U5. The header includes maximum band information, which indicates the maximum value from among numbers sequentially allocated to the respective split frequency bands (that is, the number of coded bands). The coding unit information U1 to U5 is similar to that of the code string shown in FIG. 5 and therefore will not be described further in detail.

The structure of another embodiment of the information decoding device according to the present invention will now be described with reference to FIG. 16. A code string resolution circuit 201 extracts normalized coefficient information, quantization precision information and signal frequency components from an inputted code string, and supplies the extracted information and signal frequency components to a signal component decoding circuit 202. Also, the code string resolution circuit 201 extracts maximum band information from the inputted code string and outputs the extracted maximum band information to switches 203-1 to 203-3.

The signal component decoding circuit 202 restores signal frequency components of the four frequency bands from the inputted signal frequency components on the basis of the normalized coefficient information and the quantization precision information. Then, the signal component decoding circuit 202 outputs the signal frequency component of the lowest frequency band to the switch 203-1, and outputs the signal frequency component of the second lowest frequency band to the switch 203-2. The signal component decoding circuit 202 outputs the signal frequency component of the third lowest frequency band to the switch 203-3, and outputs the signal frequency component of the highest frequency band to an inverse spectral conversion circuit 205-4.

The switches 203-1 to 203-3 switch the output destinations of the inputted signal frequency components to corresponding band limitation circuits 204-1 to 204-3 or inverse spectral conversion circuits 205-1 to 205-3, or are set in the off-state, on the basis of the maximum band information. For example, if the maximum band information indicates the lowest frequency band, the switch 203-1 switches the output destination of the signal frequency component to the band limitation circuit 204-1, and the switches 203-2 and 203-3 are set in the off-state. If the maximum band information indicates the second lowest frequency band, the switch 203-2 switches the output destination of the signal frequency component to the band limitation circuit 204-2, and the switch 203-1 switches the output destination of the signal frequency component to the inverse spectral conversion circuit 205-1. The switch 203-3 is set in the off-state. If the maximum band information indicates the third lowest frequency band, the switch 203-3 switches the output destination of the signal frequency component to the band limitation circuit 204-3, and the switches 203-1 and 203-2 switch the output destinations of the signal frequency components to the inverse spectral conversion circuits 205-1 and 205-2, respectively. If the maximum band information indicates the highest frequency band, the switches 203-1 to 203-3 switch the output destinations of the signal frequency components to the inverse spectral conversion circuits 205-1 to 205-3, respectively.

The band limitation circuits 204-1 to 204-3 limit the signals (i.e., set the value of the signals to 0 or a value proximate to 0) of the region where the filter characteristics of the band splitting filter 121 (FIG. 1) overlap, from the inputted signal frequency components, and output the band-limited signal frequency components to the corresponding inverse spectral conversion circuits 205-1 to 205-3.

The inverse spectral conversion circuits 205-1 to 205-4 carry out inverse spectral conversion processing corresponding to the spectral conversion circuits 122-1 to 122-4 (FIG. 1), and output the resultant waveform element signals to a band synthesis filter 206 corresponding to the band splitting filter 121. The band synthesis filter 206 synthesizes acoustic waveform signals from the signals of four bands supplied from the inverse spectral conversion circuits 205-1 to 205-4, and outputs the acoustic waveform signals.

Figure 17:
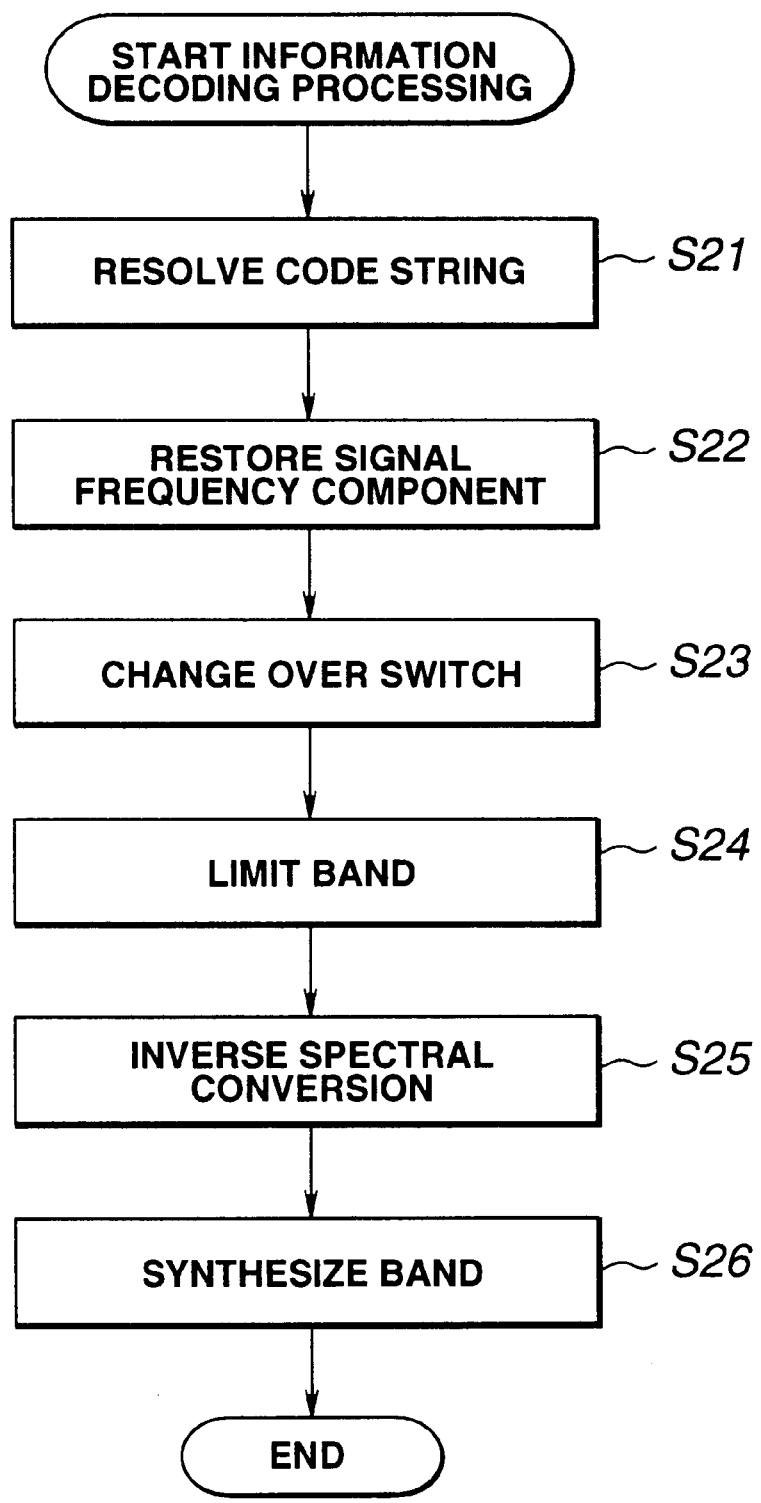
FIG. 17 is a flowchart for explaining information decoding processing of the information decoding device of FIG. 16.

The operation of this information decoding device will now be described with reference to the flowchart of FIG. 17. At step S21, the code string resolution circuit 201 extracts normalized coefficient information, quantization precision information and signal frequency components from an inputted code string, and supplies the extracted information and signal frequency components to the signal component decoding circuit 202. At the same time, the code string resolution circuit 201 extracts maximum band information from the inputted code string, and outputs the extracted maximum band information to the switches 203-1 to 203-3.

At step S22, the signal component decoding circuit 202 restores signal frequency components of four frequency bands from the inputted signal frequency components on the basis of the normalized coefficient information and the quantization precision information. The signal component decoding circuit 202 outputs the signal frequency component of the lowest frequency band to the switch 203-1, and outputs the signal frequency component of the second lowest frequency band to the switch 203-2. The signal component decoding circuit 202 outputs the signal frequency component of the third lowest frequency band to the switch 203-3, and outputs the signal frequency component of the highest frequency band to the inverse spectral conversion circuit 205-4.

At step S23, the switches 203-1 to 203-3 switch the output destinations of the inputted signal frequency components to the corresponding band limitation circuits 204-1 to 204-3 or inverse spectral conversion circuits 205-1 to 205-3, or are set in the off-state, on the basis of the maximum band information.

Figure 18A:
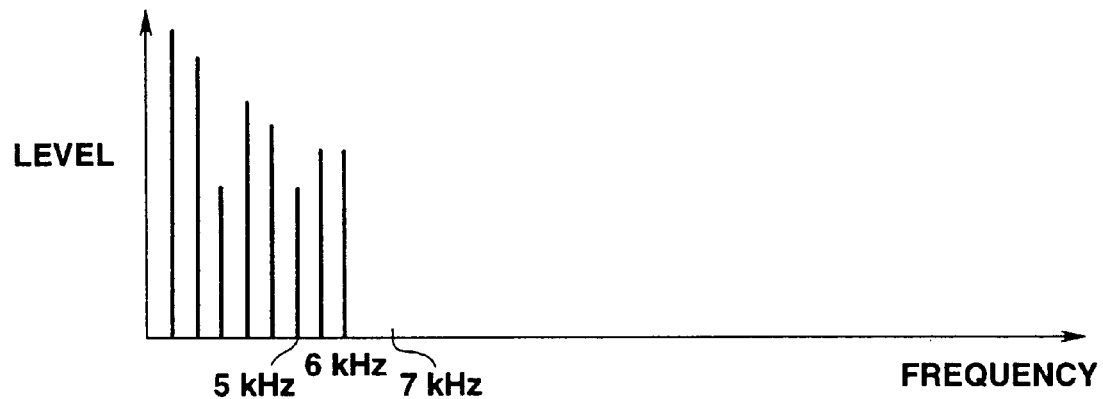
FIGS. 18A and 18B illustrate processing of a band limitation circuit 204-1 of FIG. 16.
Figure 18B:
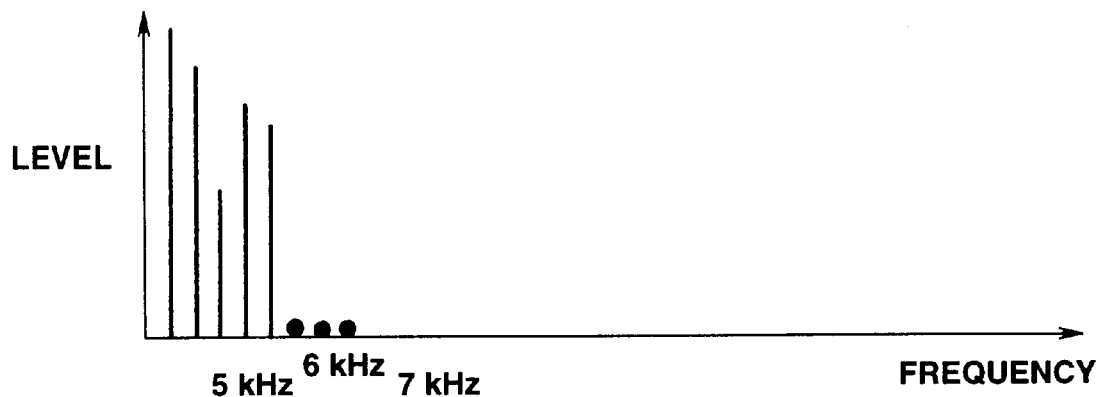

At step S24, the band limitation circuits to which the signal frequency component is inputted at step S23, from among the band limitation circuits 204-1 to 204-3, limit the signals (i.e., set the value of the signals to 0 or a value proximate to 0) of the region where the filter characteristics of the band splitting filter 121 overlap, from the signal frequency components, and output the band-limited signal frequency components to the corresponding inverse spectral conversion circuits 205-1 to 205-3. For example, if the maximum band information indicates the lowest frequency band and signal frequency components as shown in FIG. 18A are inputted to the band limitation circuit 204-1, the band limitation circuit 204-1 limits to 0 the value of the signal frequency components existing in the band (5 kHz to 7 kHz) in the vicinity of the split frequency of 6 kHz where the filter characteristics overlap, as shown in FIG. 18B. In FIGS. 18A and 18B, the lateral axis represents the frequency and the longitudinal axis represents the level of signal frequency.

At step S25, the inverse spectral conversion circuits 205-1 to 205-4 carry out inverse spectral conversion processing corresponding to the spectral conversion circuits 122-1 to 122-4 of the information coding device, and output the resultant band signals to the band synthesis filter 206 corresponding to the band splitting filter 121 of the information coding device.

At step S26, the band synthesis filter 206 synthesizes acoustic waveform signals from the signals (waveform element signals) of four bands supplied from the inverse spectral conversion circuits 205-1 to 205-4, and outputs the acoustic waveform signals.

However, at step S23, if the inputted maximum band information indicates the highest frequency band, the switches 203-1 to 203-3 switch the output destinations of the signal frequency components to the corresponding inverse spectral conversion circuits 205-1 to 205-3. Therefore, processing of step S24 is not carried out.

Figure 19:
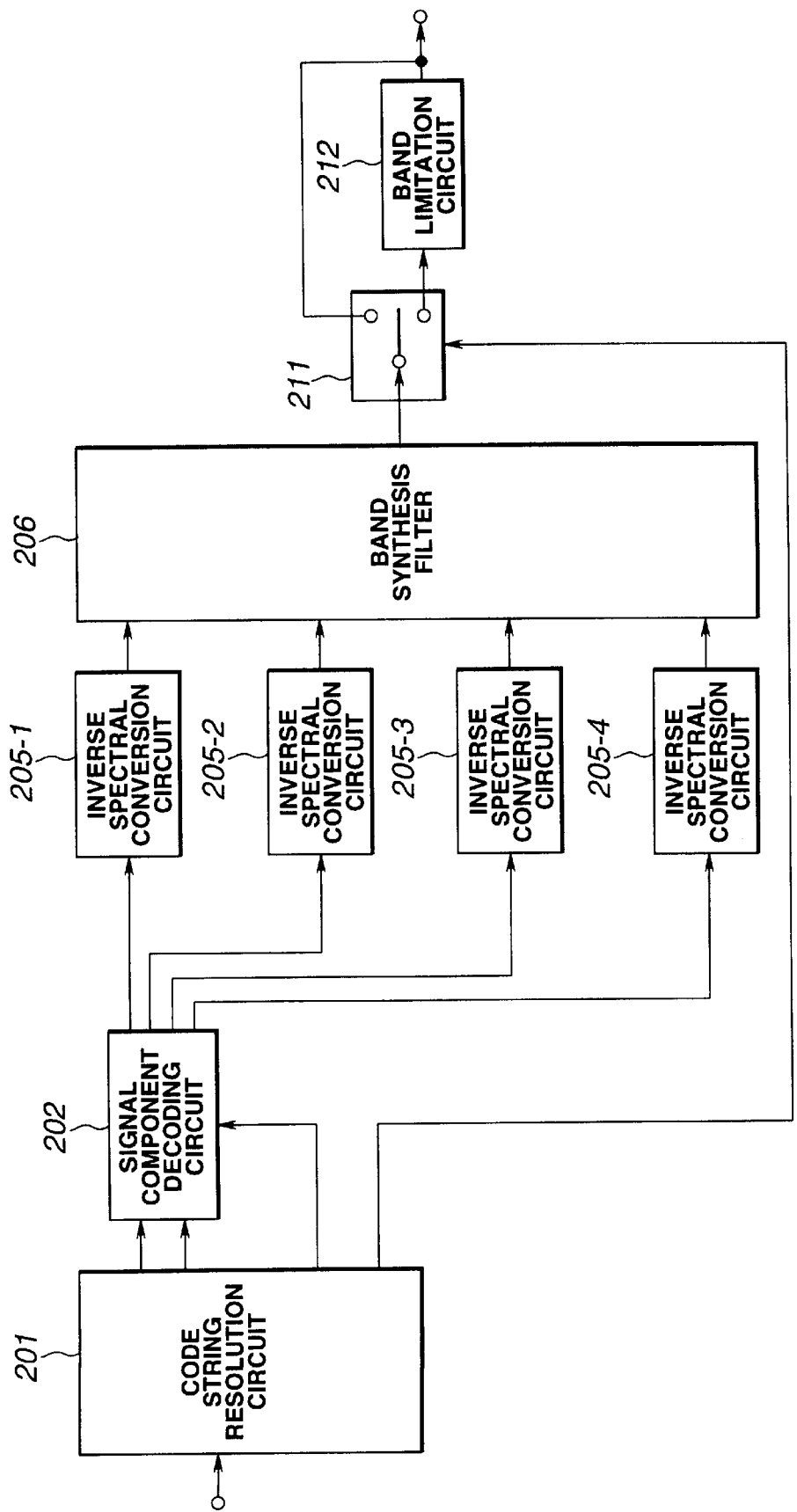
FIG. 19 is a block diagram showing the structure of still another embodiment of the information decoding device according to the present invention.

FIG. 19 is a block diagram showing an exemplary structure of still another embodiment of the information decoding device according to the present invention. This information decoding device has such a structure that the switches 203-1 to 203-3 and the band limitation circuits 204-1 to 204-3 are omitted from the information decoding device of FIG. 16 and such that a switch 211 and a band limitation circuit 212 are provided after a band synthesis filter 206. The switch 211 switches the output destination in accordance with maximum band information inputted from a code string resolution circuit 201. The other parts of the structure and the operation thereof are similar to those of the information decoding device of FIG. 16 and therefore will not be described further in detail.

Figure 16:
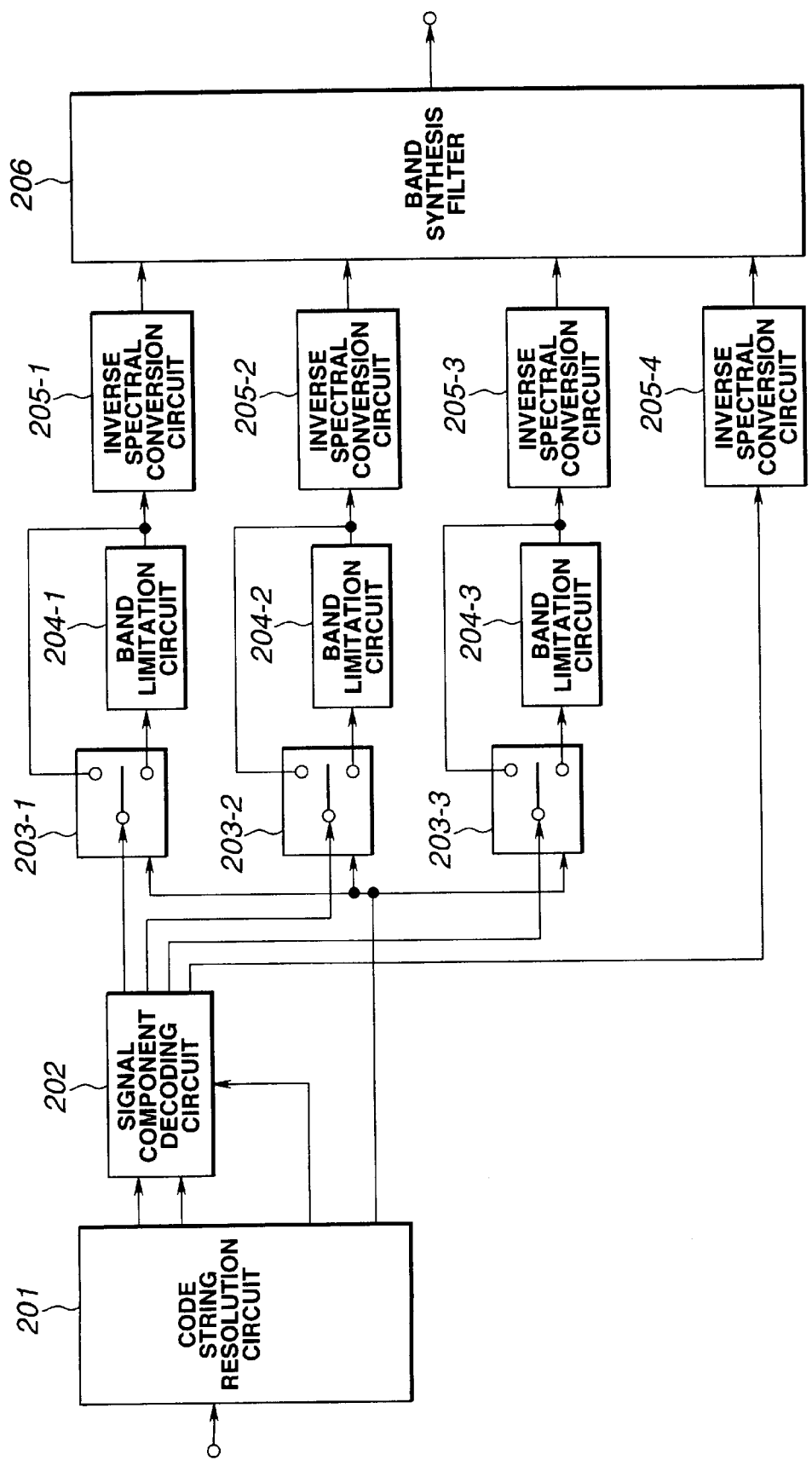
FIG. 16 is a block diagram showing the structure of still another embodiment of the information decoding device according to the present invention.

The information decoding device shown in FIG. 16 and the information decoding device shown in FIG. 19 are now compared with each other. In the information decoding device of FIG. 16, since it suffices that the band limitation circuits 204-1 to 204-3 set, at 0, the value of the signal frequency components of the region where the characteristics of the band splitting filter 121 of the information coding device overlap, the processing quantity is negligibly small and steep band limitation characteristics can be obtained. On the other hand, in the information decoding device of FIG. 19, since the band limitation circuit 212 caries out band limitation on the time base, a filter of a high order must be used to obtain steep band limitation characteristics and a further temporal delay due to filter processing is generated.

As described above, by setting at 0 the value of the signal frequency components of the region where the band splitting filter characteristics overlap so as to carry out band limitation, generation of the aliasing component and hence generation of unpleasant sounds can be restrained.

In the present embodiments, one or plural bands including the lowest frequency band are decoded. However, it is also possible to decode only an intermediate band. In such case, band limitation must be carried out on the upper and lower ends of that band.

The information decoding device of the present invention can be applied to, for example, DVD (digital versatile disc) or satellite broadcast using the MPEG (Moving Picture Experts Group) 2 or AAC (Advanced Audio Coding) system.

A computer program for carrying out the above-described processing can be provided to the user through a network providing medium such as the Internet or a digital satellite as well as a providing medium including an information recording medium such as a magnetic disk or a CD-ROM.

Thus, according to the information decoding device, the information decoding method and the providing medium, since signal components existing in a predetermined frequency region are limited on the basis of split information extracted from a code string, generation of the aliasing component and hence generation of unpleasant sounds can be restrained.

Figure 20:
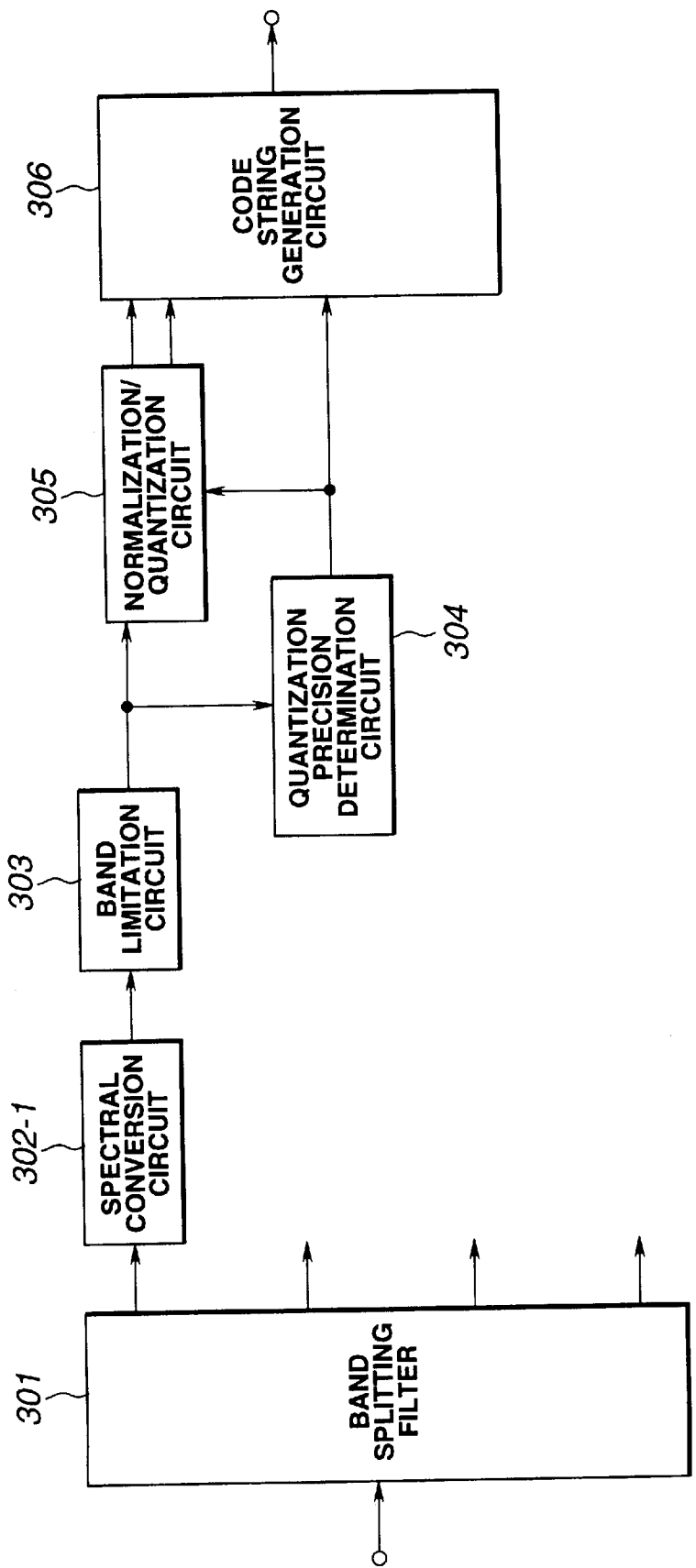
FIG. 20 is a block diagram showing the structure of an embodiment of an information coding device according to the present invention.

The structure of an information coding device according to the present invention will now be described with reference to FIG. 20. A band splitting filter 301 of this information coding device splits inputted waveform signals into four frequency bands, and outputs the signal of the lowest frequency band to a spectral conversion circuit 302-1. In this information coding device, since only the lowest frequency band is coded, the signals of the other frequency bands are not processed. As the band splitting filter 301, a polyphase quadrature filter or the like is used.

The spectral conversion circuit 302-1 converts the inputted signal to signal frequency components and outputs the signal frequency components to a band limitation circuit 303. The band limitation circuit 303 removes the signal frequency component existing in the band where the filter characteristics of the band splitting filter 301 overlap, and supplies the resultant signal frequency components to a quantization precision determination circuit 304 and a normalization/quantization circuit 305. The quantization precision determination circuit 304 determines the quantization precision in accordance with the quantity of inputted signal frequency components, and outputs the determined information to the normalization/quantization circuit 305 and a code string generation circuit 306. The normalization/quantization circuit 305 carries out normalization and quantization of the inputted signal frequency components on the basis of the quantization precision information, and outputs the resultant signal frequency components together with normalized coefficient information indicating a normalized coefficient to the code string generation circuit 306.

The code string generation circuit 306 generates a code string from the quantization precision information inputted from the quantization precision determination circuit 304 and the normalized coefficient information and coded signal frequency components inputted from the normalization/quantization circuit 305, and outputs the code string.

Figure 7:
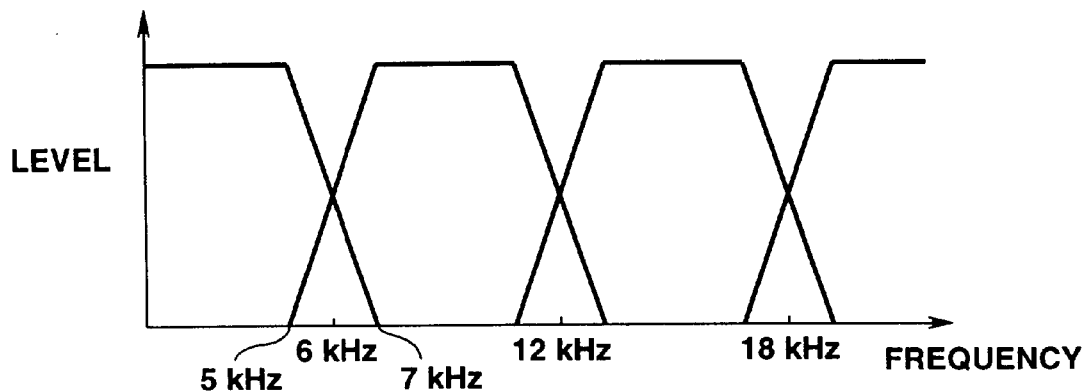
FIG. 7 shows characteristics of a band splitting filter 121 of FIG. 1.
Figure 8:
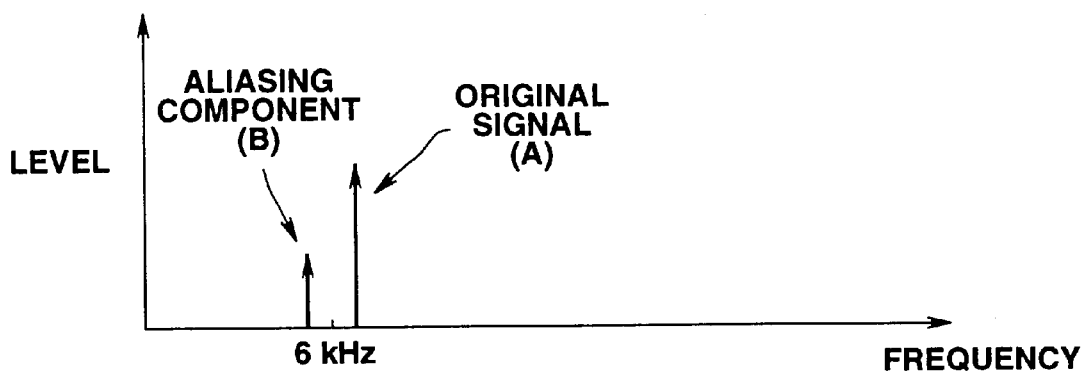
FIG. 8 illustrates an aliasing component of a signal.
Figure 21:
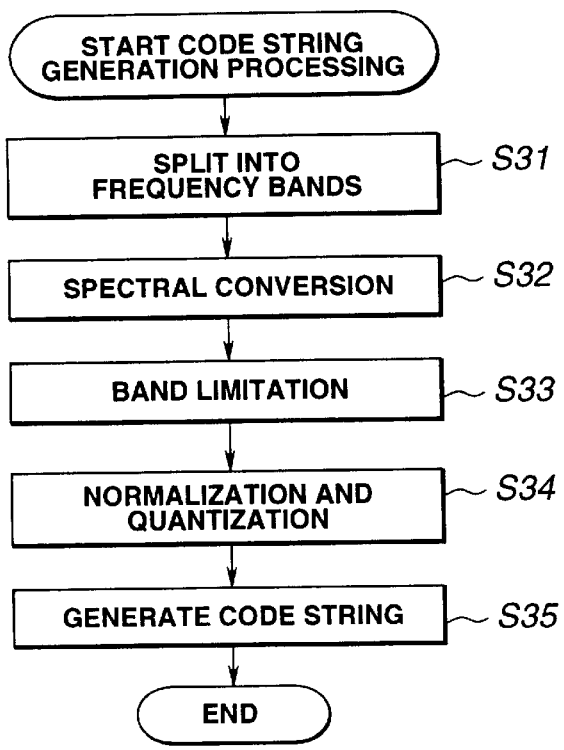
FIG. 21 is a flowchart for explaining information coding processing of the information coding device of FIG. 20.

The operation of this information coding device will now be described with reference to the flowchart of FIG. 21. At step S31, the band splitting filter 301 splits inputted waveform signals into four frequency bands as shown in FIG. 7, and outputs the signal of the lowest frequency band to the spectral conversion circuit 302-1.

Figure 22A:
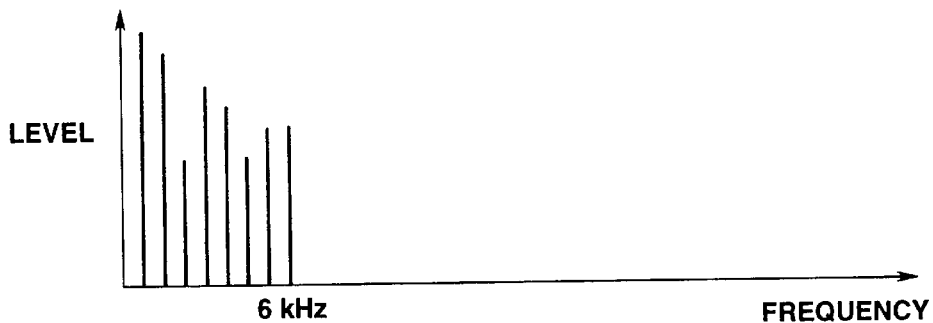
FIGS. 22A and 22B illustrate processing of a band limitation circuit 303 of FIG. 20.

At step S32, the spectral conversion circuit 302-1 converts the inputted signal not higher than 6 kHz to signal frequency components as shown in FIG. 22A, and outputs the signal frequency components to the band limitation circuit 303.

Figure 22B:
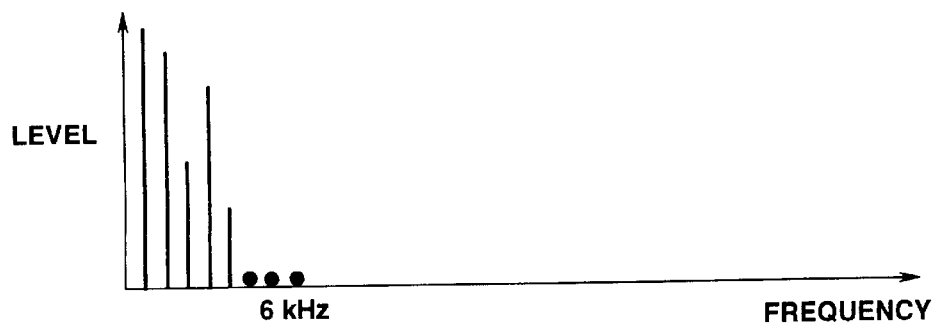

At step S33, the band limitation circuit 303 limits (i.e., sets the level at 0 or a value proximate to 0) the signal frequency component existing in the region (5 kHz to 7 kHz) where the filter characteristics of the band splitting filter 301 overlap, as shown in FIG. 22B, and supplies the resultant signal frequency components to the quantization precision determination circuit 304 and the normalization/quantization circuit 305.

At step S34, the quantization precision determination circuit 304 determines the quantization precision in accordance with the quantity of inputted signal frequency components, and outputs the determined information to the normalization/quantization circuit 305 and the code string generation circuit 306. The normalization/quantization circuit 305 carries out normalization and quantization of the inputted signal frequency components on the basis of the quantization precision information, and outputs the resultant signal frequency components together with normalized coefficient information indicating a normalized coefficient to the code string generation circuit 306.

At step S35, the code string generation circuit 306 generates a code string from the quantization precision information inputted from the quantization precision determination circuit 304 and the normalized coefficient information and coded signal frequency components inputted from the normalization/quantization circuit 305, and outputs the code string.

Figure 23:
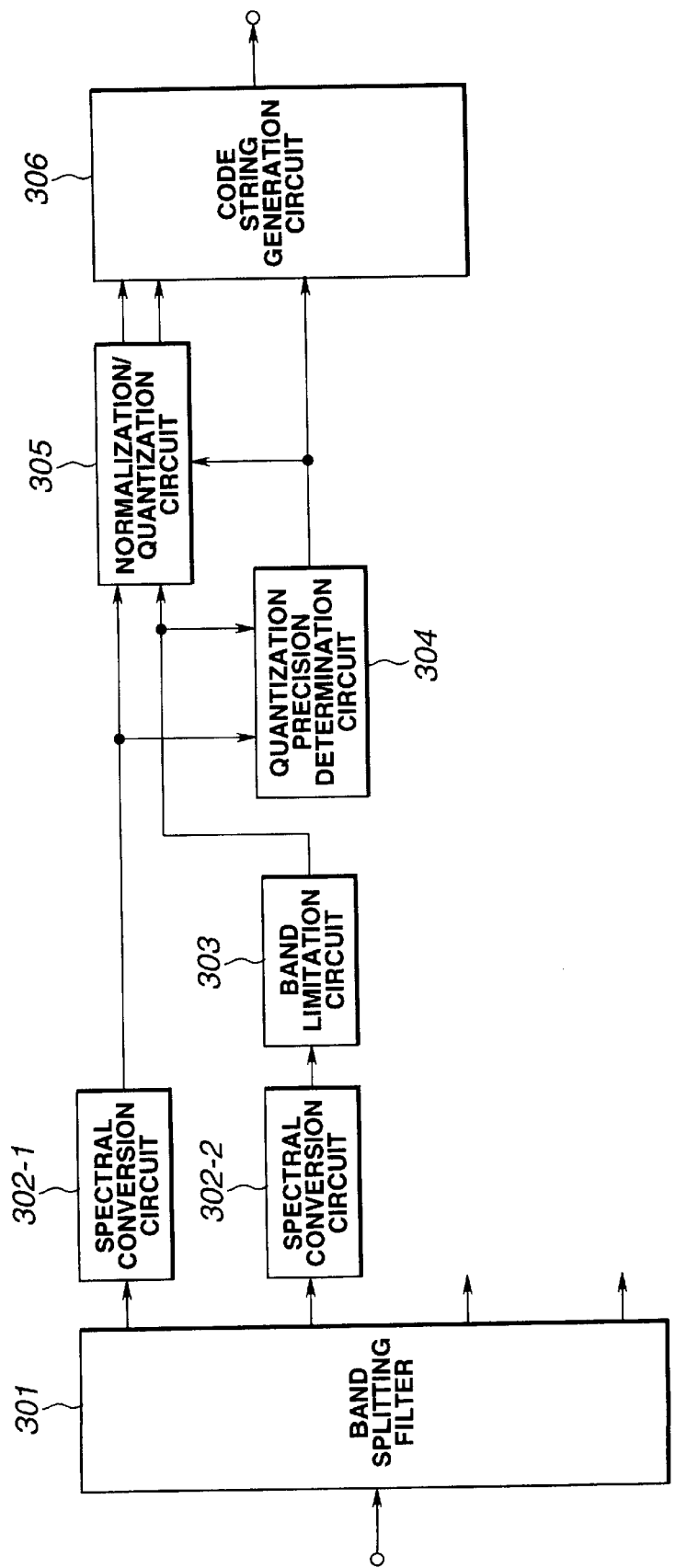
FIG. 23 is a block diagram showing the structure of another embodiment of the information coding device according to the present invention.

FIG. 23 shows another exemplary structure of the information coding device according to the present invention. This information coding device is adapted for coding signals of the lowest frequency band up to the second lowest frequency band from among frequency bands split by a band splitting filter 301, and has such a structure that a spectral conversion circuit 302-2 for spectrally converting the signal of the second lowest frequency band is added to the information coding device of FIG. 20. A band limitation circuit 303 limits signal frequency components existing in the band where the filter characteristics overlap, in the vicinity of the split frequency (12 kHz) shown in FIG. 7. The other parts of the structure are similar to those of the information coding device of FIG. 20 and therefore will not be described further in detail.

Figure 24:
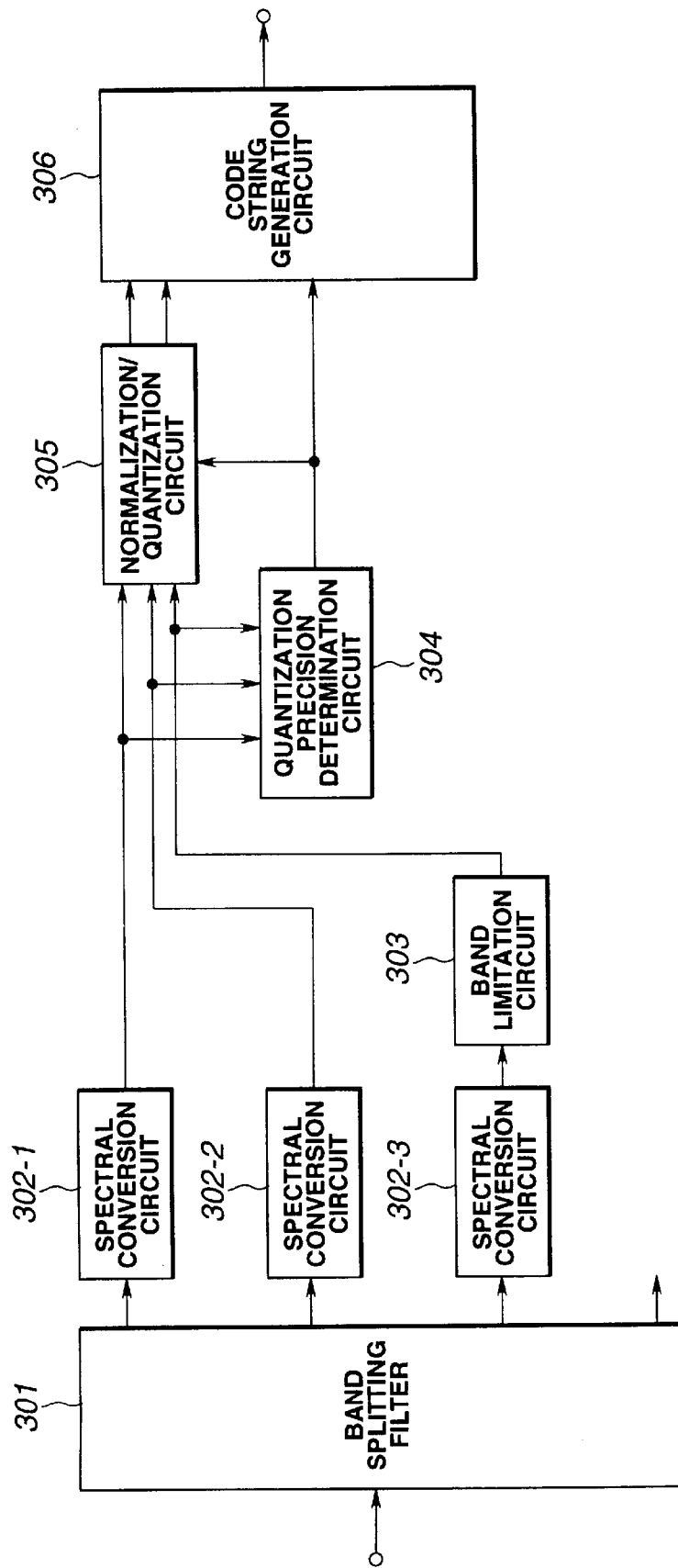
FIG. 24 is a block diagram showing the structure of still another embodiment of the information coding device according to the present invention.

FIG. 24 shows still another exemplary structure of the information coding device according to the present invention. This information coding device is adapted for coding signals of the lowest frequency band up to the third lowest frequency band from among frequency bands split by a band splitting filter 301, and has such a structure that a spectral conversion circuit 302-3 for spectrally converting the signal of the third lowest frequency band is added to the information coding device of FIG. 23. A band limitation circuit 303 limits signal frequency components existing in the band where the filter characteristics overlap, in the vicinity of the split frequency (18 kHz) shown in FIG. 7. The other parts of the structure are similar to those of the information coding device of FIG. 23 and therefore will not be described further in detail.

Figure 25:
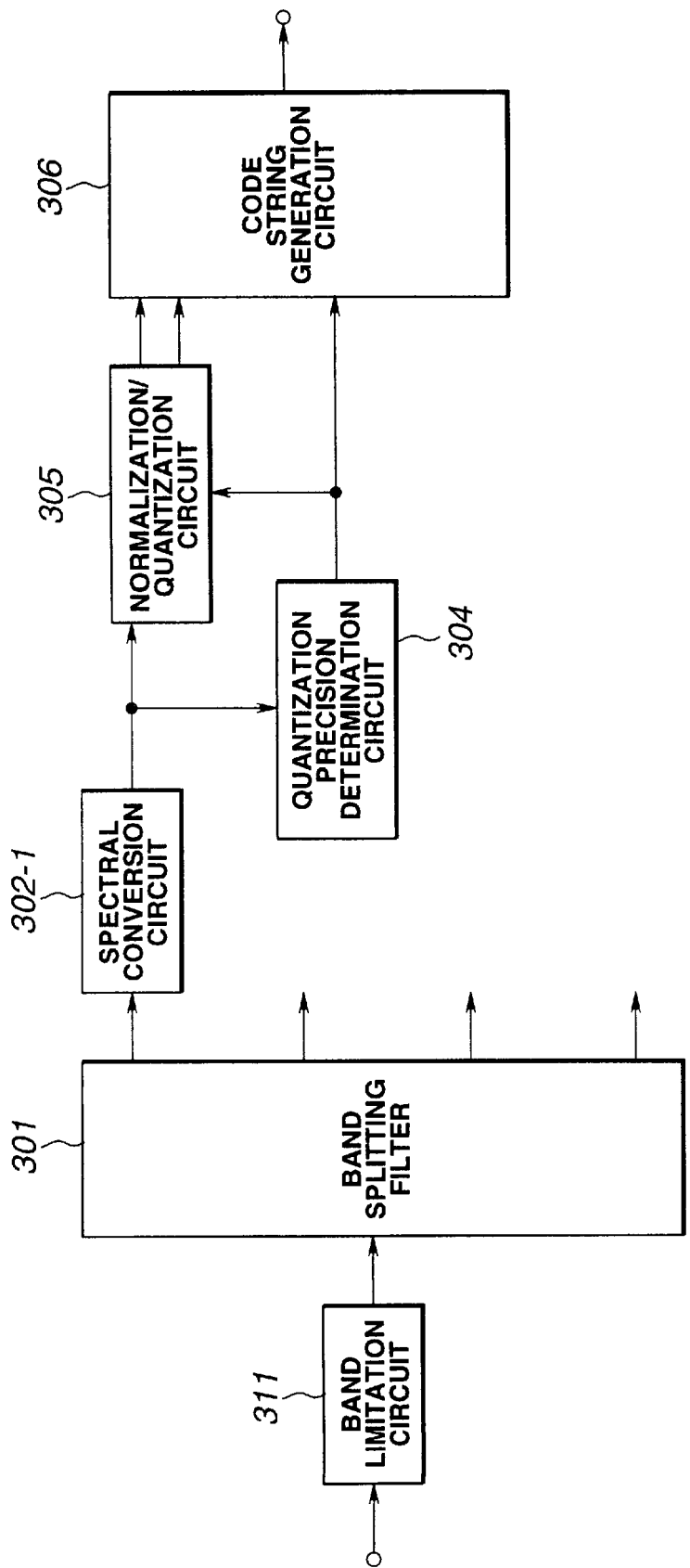
FIG. 25 is a block diagram showing the structure of still another embodiment of the information coding device according to the present invention.

FIG. 25 shows still another exemplary structure of the information coding device according to the present invention. This information coding device has such a structure that the band limitation circuit 303 of the information coding device of FIG. 20 is omitted and that a band limitation circuit 311 is provided prior to a band splitting filter 301. The band limitation circuit 311 limits signal frequency components existing in the region where the filter characteristics of the band splitting filter 301 overlap, from inputted waveform signals. The other parts of the structure are similar to those of the information coding device of FIG. 20 and therefore will not be described further in detail.

Figure 2:
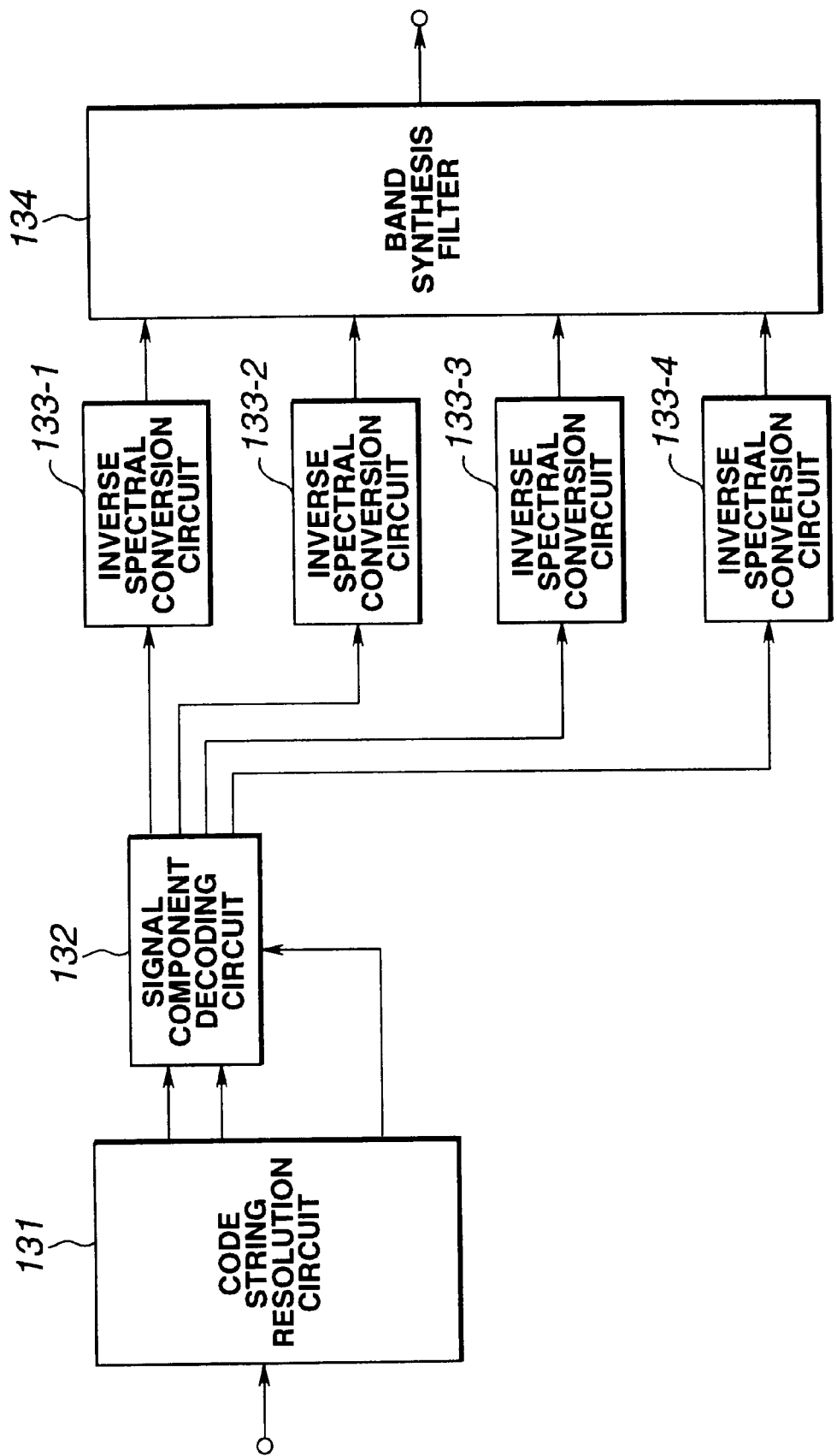
FIG. 2 is a block diagram showing an exemplary structure of a conventional information decoding device.
Figure 3:
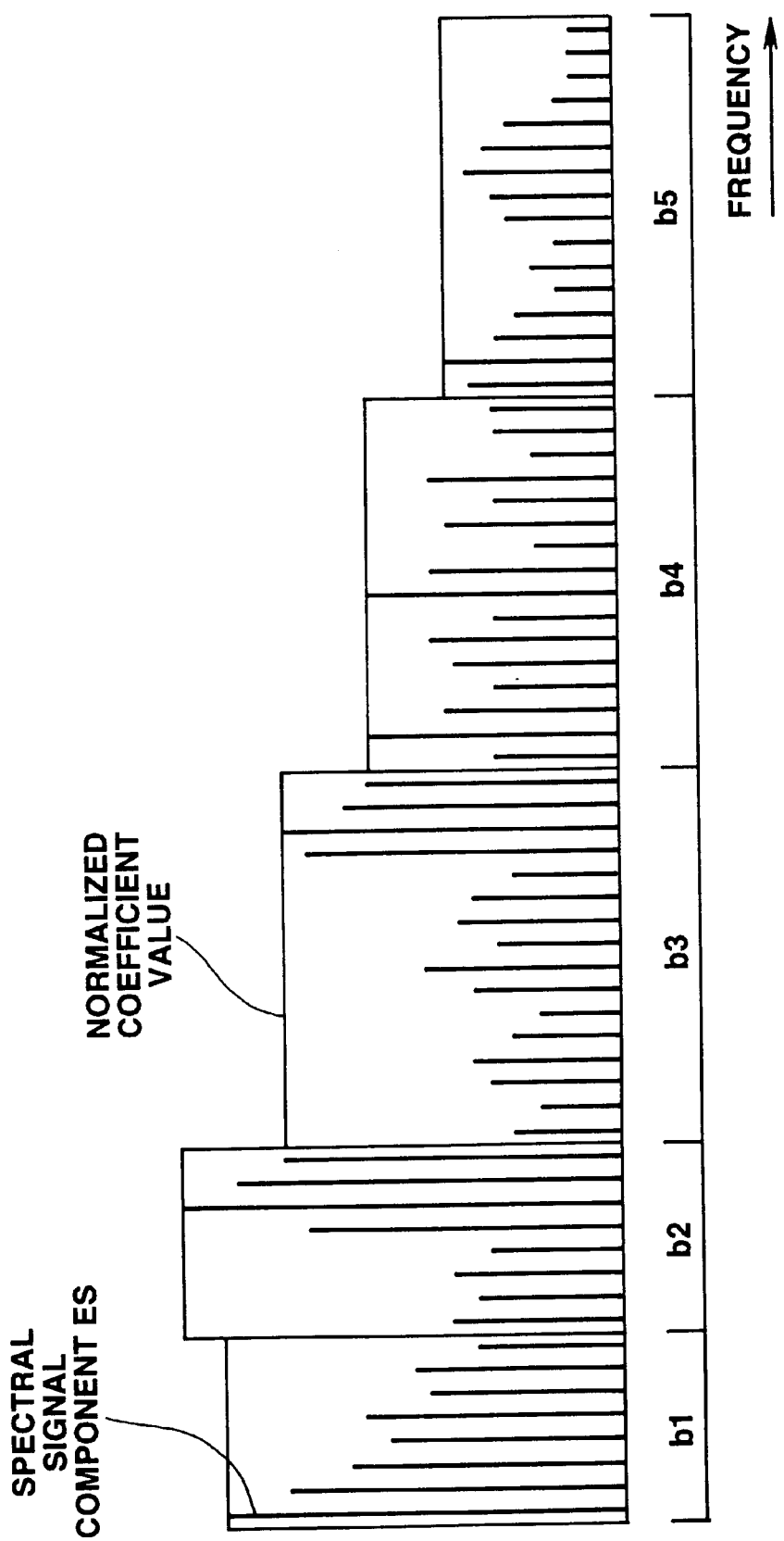
FIG. 3 shows an example of each coding unit in a frame.

As described above, in the case where a code string generated by coding a part of split frequency bands is decoded by using the information decoding device of FIG. 2, since no signal frequency component exists in the band (5 kHz to 7 kHz) where the filter characteristics overlap around the split frequency (6 kHz) of this code string, no aliasing component is generated. Therefore, deterioration in sound quality due to noise is restrained.

Although the number of split bands generated by the band splitting filter 301 of the information coding device is set to four, the number of split bands is not limited to four and may be greater or smaller than four.

In the present embodiments, one or plural bands including the lowest frequency band are decoded. However, it is also possible to decode only an intermediate band. In such case, band limitation must be carried out on the upper and lower ends of that band.

The information coding device of the present invention can be applied to, for example, DVD (digital versatile disc)

or satellite broadcast using the MPEG (Moving Picture Experts Group) 2 or AAC (Advanced Audio Coding) system.

A computer program for carrying out the above-described processing can be provided to the user through a network providing medium such as the Internet or a digital satellite as well as a providing medium including an information recording medium such as a magnetic disk or a CD-ROM.

Thus, according to the information coding device, the information coding method and the providing medium, since coding is carried out by limiting signal components existing in a predetermined frequency region, generation of the aliasing component and hence generation of unpleasant sounds can be restrained when the signal is decoded.

What is claimed is:

1. An information decoding method for decoding a signal comprising at least one frequency band from a code string obtained by converting and coding a signal split into a plurality of adjacent frequency bands, including a first frequency band adjacent to a second frequency band, the method comprising:

selecting the first frequency band as a frequency band to be decoded and selecting the second frequency band as a frequency band not to be decoded;

in the first frequency band, band-limiting a signal component in a filtering frequency overlap region between the first frequency band and the second frequency band; and inversely converting the band-limited signal component in the first frequency band.

2. The information decoding method as claimed in claim 1, wherein the first frequency band comprises a band on the low-frequency side of the plurality of adjacent frequency bands.

3. The information decoding method as claimed in claim 1, further comprising synthesizing signals of the plurality of bands.

4. The information decoding method as claimed in claim 3, wherein the signal component is band-limited before the signals of the plurality of bands are synthesized.

5. The information decoding method as claimed in claim 3, wherein the signal component is band-limited after the signals of the plurality of bands are synthesized.

6. The information decoding method as claimed in claim 3, wherein the signals of the plurality of bands are synthesized using an inverse polyphase quadrature filter.

7. The information decoding method as claimed in claim 3, wherein inversely converting the band-limited signal component includes converting a frequency signal component to a time signal, and wherein synthesizing signals comprises band synthesis including the band-limited signal.

8. The information decoding method as claimed in claim 1, wherein the signal component is band-limited before the signal of the band is inversely converted.

9. The information decoding method as claimed in claim 1, wherein the signal component is band-limited after the signal of the band is inversely converted.

10. The information decoding method as claimed in claim 1, wherein band splitting comprises polyphase quadrature filtering.

11. The information decoding method as claimed in claim 1, wherein inversely converting the band-limited signal component includes converting a frequency signal component to a time signal.

12. The information decoding method as claimed in claim 1, wherein band-limiting the signal component includes setting the overlap region between the first frequency band and the second frequency band at 0 or a value proximate to 0.

13. The information decoding method as claimed in claim 1, wherein the filtering frequency overlap region is a quadrature filter overlap region.

14. An information decoding device for decoding a signal comprising at least one frequency band from a code string obtained by converting and coding a signal split into a plurality of adjacent frequency bands, including a first frequency band adjacent to a second frequency band, the device comprising:

means for selecting the first frequency band as a frequency band to be decoded and selecting the second frequency band as a frequency band not to be decoded;

means for band-limiting, in the first frequency band, a signal component in a filtering frequency overlap region between the first frequency band and the second frequency band; and means for inversely converting the band-limited signal component in the first frequency band.

15. The information decoding device as claimed in claim 14, wherein the first frequency band comprises a band on the low-frequency side of the plurality of adjacent frequency bands.

16. The information decoding device as claimed in claim 14, further comprising means for synthesizing signals of the plurality of bands.

17. The information decoding device as claimed in claim 16, wherein the signal component is band-limited before the signals of the plurality of bands are synthesized.

18. The information decoding device as claimed in claim 16, wherein the signal component is band-limited after the signals of the plurality of bands are synthesized.

19. The information decoding device as claimed in claim 16, wherein the synthesis means comprises an inverse polyphase quadrature filter.

20. The information decoding device as claimed in claim 16, wherein the inverse conversion means converts a frequency signal component to a time signal, and wherein the synthesis means performs band synthesis.

21. The information decoding device as claimed in claim 14, wherein the signal component is band-limited before the signal of the band is inversely converted.

22. The information decoding device as claimed in claim 14, wherein the signal component is band-limited after the signal of the band is inversely converted.

23. The information decoding device as claimed in claim 14, wherein band splitting comprises polyphase quadrature filtering.

24. The information decoding device as claimed in claim 14, wherein the inverse conversion means includes means for converting a frequency signal component to a time signal.

25. The information decoding device as claimed in claim 14, wherein the limitation means sets the overlap region between the first frequency band and the second frequency band at 0 or a value proximate to 0.

26. The information decoding device as claimed in claim 14, wherein the filtering frequency overlap region is a quadrature filter overlap region.

27. A providing medium for providing processing for decoding a signal comprising at least one frequency band from a code string obtained by converting and coding a signal split into a plurality of adjacent frequency bands, including a first frequency band adjacent to a second frequency band, the processing comprising:

selecting the first frequency band as a frequency band to be decoded and selecting the second frequency band as a frequency band not to be decoded;

in the first frequency band, band-limiting a signal component in a filtering frequency overlap region between the first frequency band and the second frequency band; and inversely converting the band-limited signal component in the first frequency band.

28. An information decoding method for decoding a signal comprising at least one frequency band from a code string obtained by converting and coding a signal split into a plurality of adjacent frequency bands, including a first frequency band adjacent to a second frequency band, the method comprising:

identifying that the first frequency band is encoded and the second frequency band is not encoded;

in the first frequency band, band-limiting a signal component in a filtering frequency overlap region between the first frequency band and the second frequency band; and inversely converting the band-limited signal component in the first frequency band.

29. An information decoding device for decoding a signal comprising at least one frequency band from a code string obtained by converting and coding a signal split into a plurality of adjacent frequency bands, including a first frequency band adjacent to a second frequency band, the device comprising:

means for identifying that the first frequency band is encoded and the second frequency band is not encoded;

means for band-limiting, in the first frequency band, a signal component in a filtering frequency overlap region between the first frequency band and the second frequency band; and means for inversely converting the band-limited signal component in the first frequency band.

30. A providing medium for providing processing for decoding a signal comprising at least one frequency band from a code string obtained by converting and coding a signal split into a plurality of adjacent frequency bands, including a first frequency band adjacent to a second frequency band, the processing comprising:

identifying that the first frequency band is encoded and the second frequency band is not encoded;

in the first frequency band, band-limiting a signal component in a filtering frequency overlap region between the first frequency band and the second frequency band; and inversely converting the band-limited signal component in the first frequency band.

31. An information decoding method for decoding a code string obtained by converting and coding at least one band of a signal split into a plurality of frequency bands, including a first frequency band adjacent to a second frequency band, the method comprising:

selecting the first frequency band as a frequency band to be decoded and selecting the second frequency band as a frequency band not to be decoded;

band-limiting a signal component of the first frequency band in a filtering frequency overlap region between the first frequency band and the second frequency band; and inversely converting the band-limited signal component of the first frequency band.

32. The information decoding method as claimed in claim 31, further comprising extracting a selected number of coded bands from the code string, wherein the signal component is band-limited based on the selected number of coded bands.

33. The information decoding method as claimed in claim 31, wherein inversely converting the band-limited signal component includes converting a frequency signal component to a time signal.

34. The information decoding method as claimed in claim 31, wherein band-limiting the signal component includes setting the overlap region between the first frequency band and the second frequency band at 0 or a value proximate to 0.

35. The information decoding method as claimed in claim 31, wherein the filtering frequency overlap region is a quadrature filter overlap region.

36. An information decoding device for decoding a code string obtained by converting and coding at least one band of a signal split into a plurality of frequency bands, including a first frequency band adjacent to a second frequency band, the device comprising:

means for selecting the first frequency band as a frequency band to be decoded and selecting the second frequency band as a frequency band not to be decoded;

means for band-limiting a signal component of the first frequency band in a filtering frequency overlap region between the first frequency band and the second frequency band; and means for inversely converting the band-limited signal component of the first frequency band.

37. The information decoding device as claimed in claim 36, further comprising means for extracting a selected number of coded bands from the code string, wherein the band-limiting means is based on the selected number of coded bands.

38. The information decoding device as claimed in claim 36, wherein the inverse conversion means includes means for converting a frequency signal component to a time signal.

39. The information decoding device as claimed in claim 36, wherein the band-limiting means sets the overlap region between the first frequency band and the second frequency band at 0 or a value proximate to 0.

40. The information decoding device as claimed in claim 36, wherein the filtering frequency overlap region is a quadrature filter overlap region.

41. A providing medium for providing processing for decoding a code string obtained by converting and coding at least one band of a signal split into a plurality of frequency bands, including a first frequency band adjacent to a second frequency band, the processing comprising:

selecting the first frequency band as a frequency band to be decoded and selecting the second frequency band as a frequency band not to be decoded;

band-limiting a signal component of the first frequency band in a filtering frequency overlap region between the first frequency band and the second frequency band; and inversely converting the band-limited signal of the first frequency band.

42. An information decoding method for decoding a code string obtained by coding at least one frequency band of a signal split into a plurality of adjacent frequency bands, including a first frequency band adjacent to a second frequency band, the method comprising:

selecting the first frequency band as a frequency band to be decoded and selecting the second frequency band as a frequency band not to be decoded;

in the first frequency band, restoring frequency signal components from the code string; and inversely converting the restored frequency signal components;

wherein the inverse frequency conversion step includes limiting the value of a signal component existing in a frequency overlap region between the first frequency band and the second frequency band.

43. An information decoding device for decoding a code string obtained by coding at least one frequency band of a signal split into a plurality of adjacent frequency bands, including a first frequency and adjacent to a second frequency band, the device comprising:

means for selecting the first frequency band as a frequency band to be decoded and selecting the second frequency band as a frequency band not to be decoded;

means for restoring, in the first frequency band, frequency signal components from the code string; and means for inversely converting the restored frequency signal components;

wherein the inverse frequency conversion means includes means for limiting the value of a signal component existing in a frequency overlap region between the first frequency band and the second frequency band.

44. A providing medium for providing processing for decoding a code string obtained by coding at least one frequency band of a signal split into a plurality of adjacent frequency bands, including a first frequency band adjacent to a second frequency band, the processing comprising:

selecting the first frequency band as a frequency band to be decoded and selecting the second frequency band as a frequency band not to be decoded;

in the first frequency band, restoring frequency signal components from the code string; and inversely converting the restored frequency signal components;

wherein the inverse frequency conversion step includes limiting the value of a signal component existing in a frequency overlap region between the first frequency band and the second frequency band.

45. An information coding method for coding an input signal, the method comprising:

splitting the input signal into a plurality of frequency bands, including a first frequency band adjacent to a second frequency band;

identifying the first frequency band to be coded;

band-limiting a signal component of the first frequency band in a filtering frequency overlap region between the first frequency band and the second frequency band.

46. The information coding method as claimed in claim 45, wherein the first frequency band comprises a band on the low-frequency side of the plurality of frequency bands.

47. The information coding method as claimed in claim 45, wherein the signal component is band-limited before the input signal is split.

48. The information coding method as claimed in claim 45, wherein the signal component is band-limited after the input signal is split.

49. The information coding method as claimed in claim 45, wherein the signal component is band-limited before the first frequency band is converted.

50. The information coding method as claimed in claim 45, wherein the signal component is band-limited after the first frequency band is converted.

51. The information coding method as claimed in claim 45, wherein a polyphase quadrature filter is used to split the input signal.

52. The information coding method as claimed in claim 45, wherein converting the first frequency band includes converting a time signal to a frequency signal component.

53. The information coding method as claimed in claim 45, wherein converting the first frequency band includes converting a time signal split into a plurality of bands to a frequency signal component.

54. The information coding method as claimed in claim 45, wherein the band-limiting the signal component includes setting the overlap region between the first frequency band and the second frequency band at 0 or a value proximate to 0.

55. The information coding method as claimed in claim 45, wherein the filtering frequency overlap region is a quadrature filter overlap region.

56. An information coding device for coding an input signal, the device comprising:

means for splitting the input signal into a plurality of frequency bands, including a first frequency band adjacent to a second frequency band;

means for selecting the first frequency band to be coded;

means for selecting the second frequency band not to be coded;

means for band-limiting a signal component of the first frequency band in a filtering frequency overlap region between the first frequency band and the second frequency band.

57. The information coding device as claimed in claim 56, wherein the first frequency band comprises a band on the low-frequency side of the plurality of frequency bands.

58. The information coding device as claimed in claim 56, wherein the signal component is band-limited before the input signal is split.

59. The information coding device as claimed in claim 56, the signal component is band-limited after the input signal is split.

60. The information coding device as claimed in claim 56, wherein the signal component is band-limited before the first frequency band is converted.

61. The information coding device as claimed in claim 56, wherein the signal component is band-limited after the first frequency band is converted.

62. The information coding device as claimed in claim 56, wherein a polyphase quadrature filter is used to split the input signal.

63. The information coding device as claimed in claim 56, wherein the conversion means includes means for converting a time signal to a frequency signal component.

64. The information coding device as claimed in claim 56, wherein the conversion means includes means for converting a time signal split into a plurality of bands by the splitting means to a frequency signal component.

65. The information coding device as claimed in claim 56, wherein the band-limiting means sets the overlap region between the first frequency band and the second frequency band at 0 or a value proximate to 0.

66. The information coding device as claimed in claim 56, wherein the filtering frequency overlap region is a quadrature filter overlap region.

67. A providing medium for providing processing for coding an input signal, the processing comprising:

splitting the input signal into a plurality of frequency bands, including a first frequency band adjacent to a second frequency band;

selecting the first frequency band to be coded;

selecting the second frequency band not to be coded;

band-limiting a signal component of the first frequency band in a filtering frequency overlap region between the first frequency band and the second frequency band.

68. An information coding method for coding an input signal, the method comprising:

splitting the input signal into a plurality of frequency bands, including a first frequency band adjacent to a second frequency band;

selecting the first frequency band to be coded;

selecting the second frequency band not to be coded;

converting the input signal to frequency signal components and coding the frequency signal components; and generating a code string from the coded signal components;

wherein converting the input signal includes band-limiting a signal component of the first frequency band in a filtering frequency overlap region between the first frequency band and the second frequency band.

69. An information coding device for coding an input signal, the device comprising:

means for splitting the input signal into a plurality of frequency bands, including a first frequency band adjacent to a second frequency band;

selecting the first frequency band to be coded;

selecting the second frequency band not to be coded;

means for converting the input signal to frequency signal components and coding the frequency signal components; and means for generating a code string from the coded signal components;

wherein the converting means includes means for band-limiting a signal component of the first frequency band in a filtering frequency overlap region between the first frequency band and the second frequency band.

70. A providing medium for providing processing for coding an input signal, the processing comprising:

splitting the input signal into a plurality of frequency bands, including a first frequency band adjacent to a second frequency band;

selecting the first frequency band to be coded;

selecting the second frequency band not to be coded;

converting the input signal to frequency signal components and coding the frequency signal components; and generating a code string from the coded signal components;

wherein converting the time signal includes band-limiting a signal component of the first frequency band in a filtering frequency overlap region between the first frequency band and the second frequency band.

71. A providing medium for providing a signal coded by an information coding method for coding an input signal, the information coding method comprising:

splitting the input signal into a plurality of frequency bands, including a first frequency band adjacent to a second frequency band;

selecting the first frequency band to be coded;

selecting the second frequency band not to be coded;

band-limiting a signal component of the first frequency band in a filtering frequency overlap region between the first frequency band and the second frequency band; and converting the band-limited signal.

72. A providing medium for providing a signal coded by an information coding method for coding an input signal, the information coding method comprising;

splitting the input signal into a plurality of frequency bands, including a first frequency band adjacent to a second frequency band;

selecting the first frequency band to be coded;

selecting the second frequency band not to be coded;

converting the input signal to frequency signal components and coding the frequency signal components; and generating a code string from the coded signal components;

wherein converting the time signal includes band-limiting a signal component of the first frequency band in a filtering frequency overlap region between the first frequency band and the second frequency band.

* * * * *